US012548870B2

(12) United States Patent
Li et al.

(10) Patent No.: US 12,548,870 B2
(45) Date of Patent: Feb. 10, 2026

(54) TUNABLE PHASE SHIFTER COMPRISING A TUNABLE DIELECTRIC LAYER BETWEEN FIRST AND SECOND ELECTRODES OF SPECIFIED SHEET RESISTANCE AND METHOD FOR MANUFACTURING

(71) Applicant: BOE Technology Group Co., Ltd., Beijing (CN)

(72) Inventors: Liuqing Li, Beijing (CN); Zhao Cui, Beijing (CN); Feng Qu, Beijing (CN); Qi Yao, Beijing (CN); Feng Zhang, Beijing (CN); Wenqu Liu, Beijing (CN); Liwen Dong, Beijing (CN); Zhijun Lv, Beijing (CN); Dongfei Hou, Beijing (CN); Detian Meng, Beijing (CN); Libo Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 194 days.

(21) Appl. No.: 18/281,111

(22) PCT Filed: Mar. 18, 2022

(86) PCT No.: PCT/CN2022/081692
§ 371 (c)(1),
(2) Date: Sep. 8, 2023

(87) PCT Pub. No.: WO2023/173407
PCT Pub. Date: Sep. 21, 2023

(65) Prior Publication Data

US 2025/0023217 A1 Jan. 16, 2025

(51) Int. Cl.
*H01P 1/18* (2006.01)
*H01Q 3/36* (2006.01)

(52) U.S. Cl.
CPC ................ *H01P 1/181* (2013.01); *H01P 1/18* (2013.01); *H01Q 3/36* (2013.01)

(58) Field of Classification Search
CPC .................................. H01P 1/181; H01P 1/18
USPC .......................................................... 333/161
See application file for complete search history.

(56) References Cited

U.S. PATENT DOCUMENTS

2021/0080765 A1* 3/2021 Hu et al. ................. H01P 1/184
2022/0059913 A1* 2/2022 Wu et al. .................. H01P 3/08

FOREIGN PATENT DOCUMENTS

CN 113126370 A 7/2021

* cited by examiner

*Primary Examiner* — Benny T Lee
(74) *Attorney, Agent, or Firm* — Banner & Witcoff, Ltd.

(57) ABSTRACT

A tunable phase shifter and a method for manufacturing the same, and a tunable phase shifting device. The phase shifter includes a first substrate, a second substrate, and a tunable dielectric layer between the first substrate and the second substrate; the first substrate includes a first base substrate and a first electrode on the first base substrate; the second substrate includes a second base substrate and a second electrode on the second base substrate; an orthographic projection of the first electrode on the first base substrate is at least partially overlapped with an orthographic projection of the second electrode on the first base substrate, and sheet resistances of materials of the first electrode and the second electrode are both less than or equal to 0.024Ω/□.

20 Claims, 9 Drawing Sheets

TUNABLE PHASE SHIFTER COMPRISING A TUNABLE DIELECTRIC LAYER BETWEEN FIRST AND SECOND ELECTRODES OF SPECIFIED SHEET RESISTANCE AND METHOD FOR MANUFACTURING

This application is a U.S. National Phase Entry of International Application No. PCT/CN2022/081692 filed Mar. 18, 2022, designating the United States of America. The present application claims priority to and the benefit of the above-identified application and the above-identified application is incorporated by reference herein in its entirety.

TECHNICAL FIELD

Embodiments of the present disclosure relate to a tunable phase shifter and method for manufacturing the same and a tunable phase shifting device.

BACKGROUND

With the continuous development of communication technology, the speed and breadth of information communication between people and between devices has become faster and more abundant. At the same time, the development of 5G technology also puts forward higher requirements for transmission equipments (e.g., antenna products) for electromagnetic wave signals. Antenna products have developed from omnidirectional antennas to directional antennas, and then to multi-band directional antennas.

On the other hand, with the large-scale application of 5G technology, antenna products not only need to adapt to scenarios such as large bandwidth, high reliability, low latency, large connections, etc., but also introduce a large amount of new spectrum resources to obtain higher channel capacity. Therefore, in order to meet the requirements of 5G technology for signal transmission speed and transmission content breadth, current mainstream solution is to use phased array antennas to transmit electromagnetic wave signals to achieve signal transmission and reception between communication devices.

A phased array antenna is a kind of array antenna that changes the beam direction of the radiation pattern by controlling feeding phases of radiating elements in the array antenna. The main purpose of the phased array antenna is to achieve the spatial scanning of the array beam, which is called electrical scanning. A phase shifter is an important component of the phased array antenna, which can achieve beam switching/scanning by changing the phase consistency of the antenna signals, thereby improving the performance of the communication device.

SUMMARY

Embodiments of the present disclosure provide a tunable phase shifter and a method for manufacturing the same, and a tunable phase shifting device. By applying a voltage to the first electrode and the second electrode, the tunable phase shift can make the dielectric constant of the tunable dielectric layer between the first electrode and the second electrode change, such that the phases of electromagnetic waves on the phase shifter change. Moreover, because the sheet resistances of the materials of the first electrode and the second electrode are both less than or equal to 0.024Ω/□, the transmission loss of microwave electromagnetic signals can be reduced. Therefore, the phase shifter has lower transmission loss while changing the phases of the electromagnetic wave signals.

At least one embodiment of the present disclosure provides a tunable phase shifter, which includes: a first substrate, including a first base substrate and a first electrode on the first base substrate; a second substrate, including a second base substrate and a second electrode on the second base substrate; and a tunable dielectric layer, between the first substrate and the second substrate, an orthographic projection of the first electrode on the first base substrate is at least partially overlapped with an orthographic projection of the second electrode on the first base substrate, and sheet resistances of materials of the first electrode and the second electrode are both less than or equal to 0.024Ω/□.

For example, the tunable phase shifter provided by an embodiment of the present disclosure further includes: a plurality of spacers, located between the first substrate and the second substrate to maintain an interval between the first substrate and the second substrate, two adjacent second electrodes are provided with at least one of the plurality of spacers.

For example, in the tunable phase shifter provided by an embodiment of the present disclosure, the second substrate includes an electrode region and a peripheral region on a periphery of the electrode region, the second electrode is located in the electrode region, and the peripheral region is provided with multiple spaces arranged in an array.

For example, in the tunable phase shifter provided by an embodiment of the present disclosure, a maximum dimension in a direction parallel to the first base substrate of an orthographic projection of a spacer of the plurality of the spacers on the first base substrate is D1, a distance between two adjacent ones of the plurality of spacers is D2, and a ratio of D2 to D1 ranges from 6 to 12.

For example, in the tunable phase shifter provided by an embodiment of the present disclosure, the D1 ranges from 40 microns to 60 microns, and the D2 ranges from 360 microns to 480 microns.

For example, in the tunable phase shifter provided by an embodiment of the present disclosure, a ratio of a height of a spacer of the plurality of spacers in a direction perpendicular to the second base substrate to a distance between the first substrate and the second substrate ranges from 1 to 2.30.

For example, in the tunable phase shifter provided by an embodiment of the present disclosure, a ratio of a thickness of the second electrode in a direction perpendicular to the second base substrate to a height of a spacer of the plurality of spacers in a direction perpendicular to the second base substrate ranges from 0.125 to 0.28.

For example, in the tunable phase shifter provided by an embodiment of the present disclosure, a ratio of a thickness of the second electrode in a direction perpendicular to the second base substrate to a distance between the first substrate and the second substrate ranges from 0.17 to 0.65.

For example, in the tunable phase shifter provided by an embodiment of the present disclosure, a thickness of the first electrode in a direction perpendicular to the first base substrate ranges from 1.5 microns to 5 microns, and a thickness of the second electrode in a direction perpendicular to the second base substrate ranges from 1.5 microns to 5 microns.

For example, in the tunable phase shifter provided by an embodiment of the present disclosure, a shape of a first cross section of the first electrode cut by a plane perpendicular to the first base substrate includes a trapezoid or a rectangle, and an angle range of a bottom angle of the first cross section away from the tunable dielectric layer is 70 degrees to 90 degrees; and/or a shape of a second cross section of the second electrode cut by a plane perpendicular to the second base substrate includes a trapezoid or a rectangle, and an angle range of a bottom angle of the second cross section away from the tunable dielectric layer is 70 degrees to 90 degrees.

For example, in the tunable phase shifter provided by an embodiment of the present disclosure, the first substrate further includes a first protection layer and a first alignment layer, the first protection layer is located on a side of the first electrode away from the first base substrate, and the first alignment layer is located on a side of the first protection layer away from the first base substrate.

For example, in the tunable phase shifter provided by an embodiment of the present disclosure, the second substrate further includes a second protection layer and a second alignment layer, and the second protection layer is located on a side of the second electrode away from the second base substrate, the second alignment layer is located on a side of the second protection layer away from the second base substrate.

For example, in the tunable phase shifter provided by an embodiment of the present disclosure, materials of the first protection layer and the second protection layer are one or more selected from a group consisting of silicon nitride, silicon oxide, silicon oxynitride, titanium oxide and aluminum oxide.

For example, in the tunable phase shifter provided by an embodiment of the present disclosure, a thickness of the first protection layer ranges from 1000 angstroms to 2000 angstroms.

For example, in the tunable phase shifter provided by an embodiment of the present disclosure, the first substrate includes a plurality of first electrodes spaced apart from each other and a first connection electrode connected to the plurality of first electrodes, the second substrate includes a plurality of second electrodes spaced apart from each other and a second connection electrode connected to the plurality of second electrodes, the plurality of the first electrodes and the plurality of the second electrodes are disposed in one-to-one correspondence, and an orthographic projection of the first electrode on the first base substrate is at least partially overlapped with an orthographic projection of a corresponding second electrode on the first base substrate.

For example, in the tunable phase shifter provided by an embodiment of the present disclosure, the first substrate further includes a first planarization filling structure located between adjacent ones of the plurality of first electrodes, and a thickness of the first planarization filling structure in a direction perpendicular to the first base substrate is approximately equal to a thickness of the first electrode in a direction perpendicular to the first base substrate; and/or the second substrate further includes a second planarization filling structure located between adjacent ones of the plurality of second electrodes, and a thickness of the second planarization filling structure in a direction perpendicular to the second base substrate is approximately equal to a thickness of the second electrode in a direction perpendicular to the second base substrate.

For example, in the tunable phase shifter provided by an embodiment of the present disclosure, materials of the first planarization filling structure and the second planarization filling structure include one or more selected from a group consisting of an optical adhesive, a photoresist and a photocurable adhesive.

For example, in the tunable phase shifter provided by an embodiment of the present disclosure, an overlapping distance in an arrangement direction of the plurality of first electrodes of an orthographic projection of the first electrode on the first base substrate and an orthographic projection of the corresponding second electrode on the first base substrate is greater than 90% of a dimension of the first electrode or the second electrode in the arrangement direction of the plurality of first electrodes.

For example, in the tunable phase shifter provided by an embodiment of the present disclosure, in the electrode region, an orthographic projection of a spacer of the plurality of spacers on a reference line perpendicular to the second base substrate is overlapped with an orthographic projection of the second electrode on the reference line.

For example, in the tunable phase shifter provided by an embodiment of the present disclosure, the first substrate further includes a first signal line electrically connected to the first electrode, and the second substrate includes a second signal line electrically connected to the second electrode.

At least one embodiment of the present disclosure provides a tunable phase shifting device, which includes the phase shifter as described above.

For example, the tunable phase shifting device provided by an embodiment of the present disclosure further includes: a plurality of radiating elements, disposed on a side of the first substrate away from the second substrate, or on a side of the second substrate away from the first substrate.

At least one embodiment of the present disclosure further provides a method for manufacturing a tunable phase shift, which includes: forming a first substrate, the first substrate includes a first base substrate and a first electrode on the first base substrate; forming a second substrate, the second substrate includes a second base substrate and a second electrode on the second base substrate; cell-assembling the first substrate and the second substrate, and filling a liquid crystal between the first substrate and the second substrate, so as to form a tunable dielectric layer between the first substrate and the second substrate, an orthographic projection of the first electrode on the first base substrate is at least partially overlapped with an orthographic projection of the second electrode on the first base substrate, and sheet resistances of materials of the first electrode and the second electrode are both less than or equal to 0.024Ω/□.

For example, in the method for manufacturing the tunable phase shifter provided by an embodiment of the present disclosure, forming the first substrate includes: forming a plurality of first electrodes on the first base substrate; using a plasma process to treat surfaces of the plurality of first electrodes away from the first base substrate to remove oxide layers on the surfaces of the first electrodes; and forming a first protection layer on a side of the plurality of first electrodes away from the first base substrate.

For example, in the method for manufacturing the tunable phase shifter provided by an embodiment of the present disclosure, forming the first substrate further includes: coating a low-temperature optical adhesive layer on a side of the first protection layer away from the first base substrate to form a first planarization filling structure between adjacent ones of the plurality of first electrodes, a thickness of the first planarization filling structure in a direction perpendicular to the first base substrate is approximately equal to a thickness of the first electrode in a direction perpendicular to the first base substrate.

For example, in the method for manufacturing the tunable phase shifter provided by an embodiment of the present disclosure, forming the second substrate includes: forming a plurality of second electrodes on the second base substrate; using a plasma process to treat surfaces of the plurality of the second electrodes away from the second base substrate to remove oxide layers on the surfaces of the second electrodes; and forming a second protection layer on a side of the plurality of second electrodes away from the second base substrate.

For example, in the method for manufacturing the tunable phase shifter provided by an embodiment of the present disclosure, forming the second substrate further includes: coating a low-temperature optical adhesive layer on a side of the second protection layer away from the second base substrate to form a second planarization filling structure between adjacent ones of the plurality of second electrodes, a thickness of the second planarization filling structure in a direction perpendicular to the second base substrate is approximately equal to a thickness of the second electrode in a direction perpendicular to the second base substrate.

For example, the method for manufacturing the tunable phase shifter provided by an embodiment of the present disclosure further includes: coating a photoresist material layer on a side of the first substrate close to the second substrate; and exposing the photoresist material layer by a photolithography process to form a plurality of spacers, a maximum dimension of an orthographic projection of a spacer of the plurality of the spacers on the first base substrate in a direction parallel to the first base substrate is D1, and a distance between two adjacent ones of the plurality of spacers is D2, and a ratio of D2 to D1 ranges from 6 to 12.

BRIEF DESCRIPTION OF DRAWINGS

In order to more clearly explain the technical scheme of the embodiments of the present disclosure, the following will briefly introduce the drawings of the embodiments. Obviously, the drawings in the following description only relate to some embodiments of the present disclosure, but not limit the present disclosure.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. Similar words such as "connected" or "connected" are not limited to physical or mechanical connection, but can include electrical connection, whether direct or indirect.

Figure 1A:
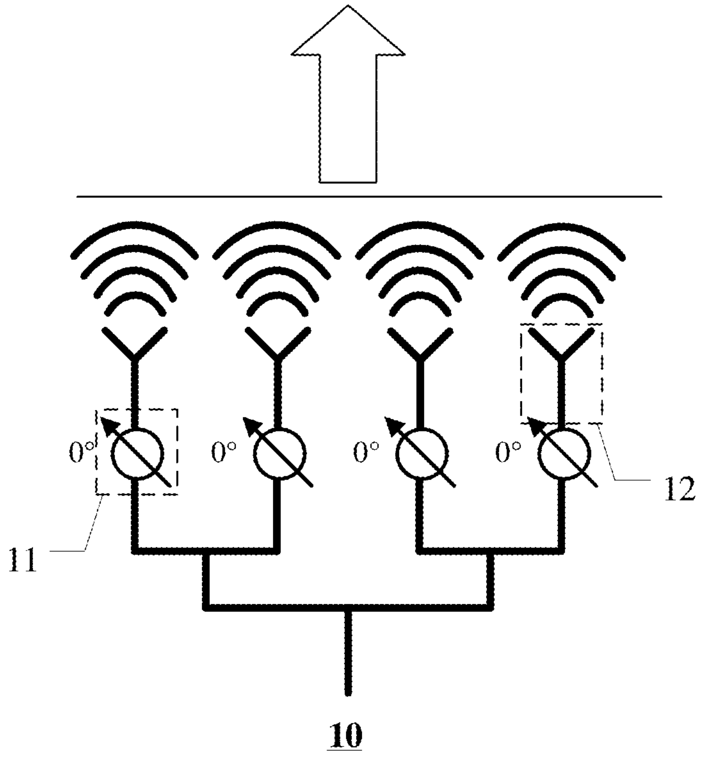
FIG. 1A is a schematic view of a phased array antenna.
Figure 1B:
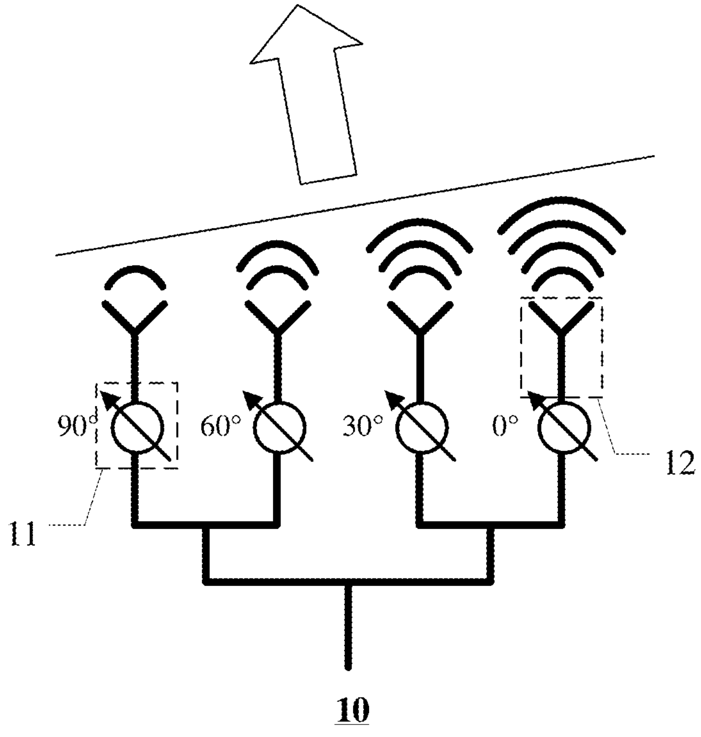
FIG. 1B is a schematic view of a phased array antenna.

FIG. 1A and FIG. 1B are schematic views of a phased array antenna. As shown in FIG. 1A and FIG. 1B, the phased array antenna 10 includes a plurality of phase shifters 11 and a plurality of radiating elements 12, and the plurality of phase shifters 11 and the plurality of radiating elements 12 are disposed correspondingly. The plurality of phase shifters 11 in FIG. 1A do not change the phases (for example, 0 degrees, 0 degrees, 0 degrees and 0 degrees as shown in FIG. 1A) of the antenna signals, while the plurality of phase shifters 11 in FIG. 1B change the phases (for example, 90 degrees, 60 degrees, 30 degrees and 0 degrees as shown in FIG. 1B) of the antenna signals sent by the plurality of radiating elements 12, thereby changing the beam direction. As such, the phased array antenna can achieve spatial scanning of the array beam through the plurality of phase shifters.

Currently, mechanical phase shifters and electronic phase shifters are two types of phase shifters that are mainly used. A fatal disadvantage of the mechanical phase shifter is that it cannot change phases quickly in a very short time due to the constraint of inertia, but the signal transmission in 5G era requires rapid change of phases in milliseconds or even less time; the mechanical phase shifter has large volume and large weight. On the other hand, the electronic phase shifter can change phases quickly, and has the advantages of small size and small weight. However, although the electronic phase shifter overcomes the disadvantages of the mechanical phase shifter, the cost of the electronic phase shifter is too high, the design is complicated, the intermodulation performance is poor, and continuous phase modulation cannot be achieved.

In addition to the above-mentioned mechanical phase shifter and electronic phase shifter, a liquid crystal phase shifter is a new type of phase shifter based on the basic principle of liquid crystal grating, in which through forming an overlapping capacitor on two sides of a liquid crystal layer, the dielectric constant of a liquid crystal material in the liquid crystal layer changes the phase of an electromagnetic wave on the liquid crystal phase shifter, and finally achieves the effect of adjusting the phase shift amount. The liquid crystal phase shifter not only overcomes the shortcomings (i.e., large volume and large weight, and unable to quickly change the phase in a very short time) of the mechanical phase shifter, but also overcomes the shortcomings (i.e., poor intermodulation performance and unable to continuously modulate the phase) of the electronic phase shifter. In addition, the liquid crystal phase shifter can be manufactured by a simple process, has small volume and weight, and low cost.

The two most important indexes that affect the performance of liquid crystal phase shifter are the magnitude and loss (transmission line loss and dielectric loss) of the phase shift amount. The existing liquid crystal phase shifter mainly has the problems of low phase shift amounts, poor uniformity of phase shift amounts, and high loss. With the increasing requirements of 5G technology for the phased array antenna, the phase shift amounts, the uniformity of phase shift amounts and loss of existing liquid crystal phase shifters are difficult to meet the requirements of communication speed and accuracy.

In this regard, embodiments of the present disclosure provide a tunable phase shifter, a method for manufacturing the same, and a tunable phase shifting device. The tunable phase shifter includes a first substrate, a second substrate, and a tunable dielectric layer between the first substrate and the second substrate; the first substrate includes a first base substrate and a first electrode on the first base substrate; the second substrate includes a second base substrate and a second electrode on the second base substrate; an orthographic projection of the first electrode on the first base substrate is at least partially overlapped with an orthographic projection of the second electrode on the first base substrate, and the sheet resistances of the materials of the first electrode and the second electrode are both less than or equal to 0.024Ω/□. As such, because the orthographic projection of the first electrode on the first base substrate is at least partially overlapped with the orthographic projection of the second electrode on the first base substrate, the first electrode and the second electrode can form an overlapping capacitor, in the case that voltages are applied to the first electrode and the second electrode, the dielectric constant of the tunable dielectric layer between the first electrode and the second electrode would change, such that the phases of the electromagnetic waves on the phase shifter change. Moreover, because the sheet resistances of the materials of the first electrode and the second electrode are both less than or equal to 0.024Ω/□, the transmission loss of microwave electromagnetic signals can be reduced. Therefore, the phase shifter has lower transmission loss while changing the phases of the electromagnetic wave signals.

Hereinafter, the tunable phase shifter and method for manufacturing the same, and the tunable phase shifting device provided by the embodiments of the present disclosure will be described in detail with reference to the accompanying drawings.

Figure 2A:
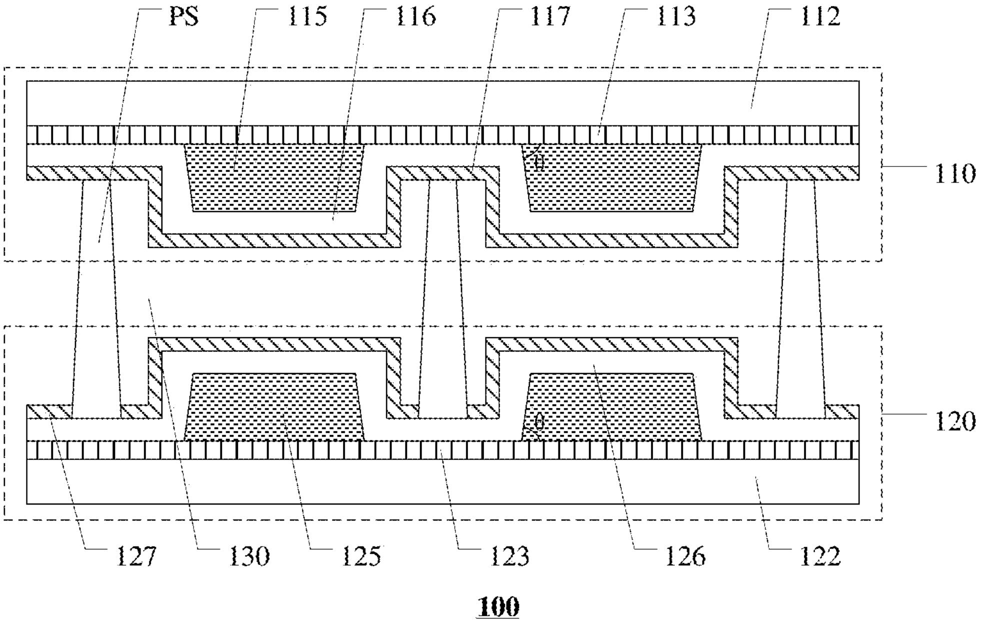
FIG. 2A is a schematic structural view of a tunable phase shifter provided by an embodiment of the present disclosure.
Figure 2B:
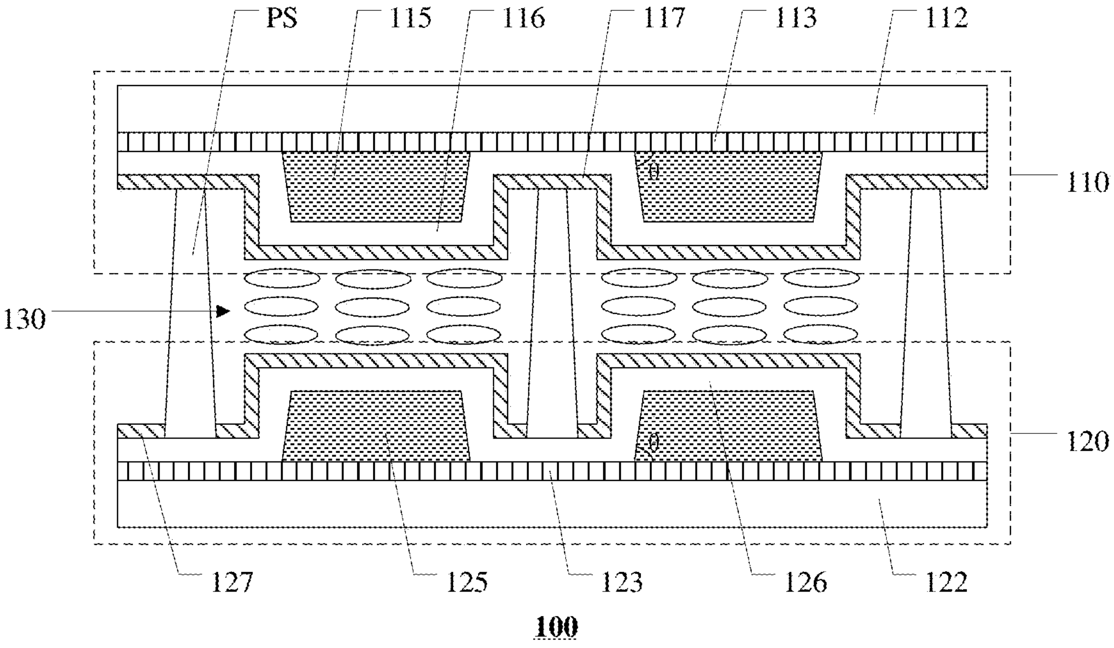
FIG. 2B is a schematic structural view of another tunable phase shifter provided by an embodiment of the present disclosure.
Figure 2C:
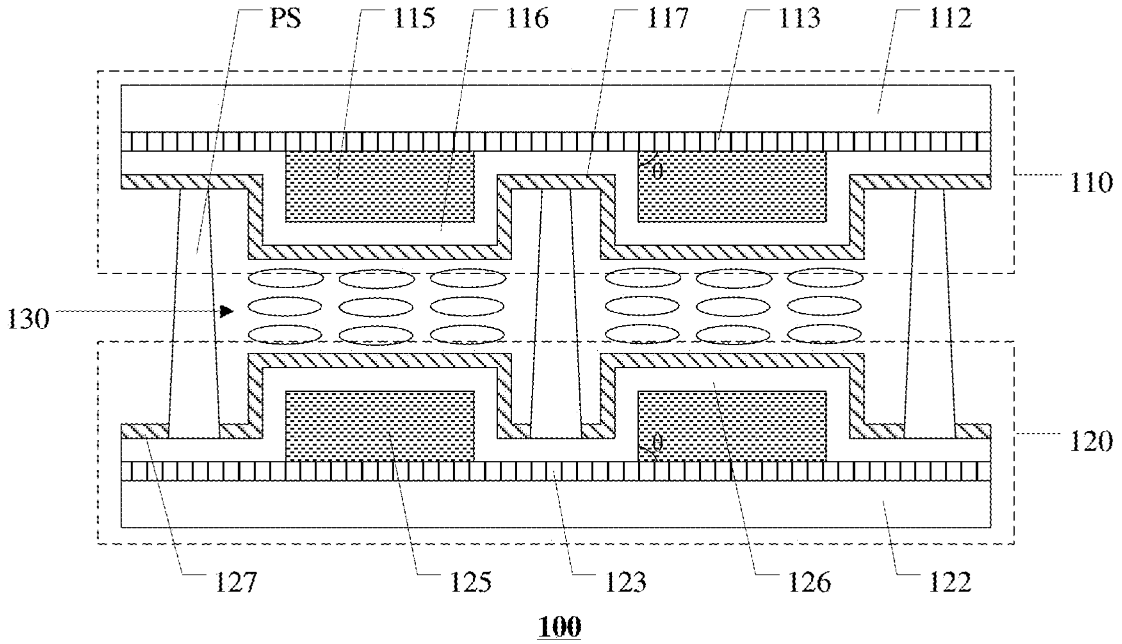
FIG. 2C is a schematic structural view of another tunable phase shifter provided by an embodiment of the present disclosure.
Figure 3A:
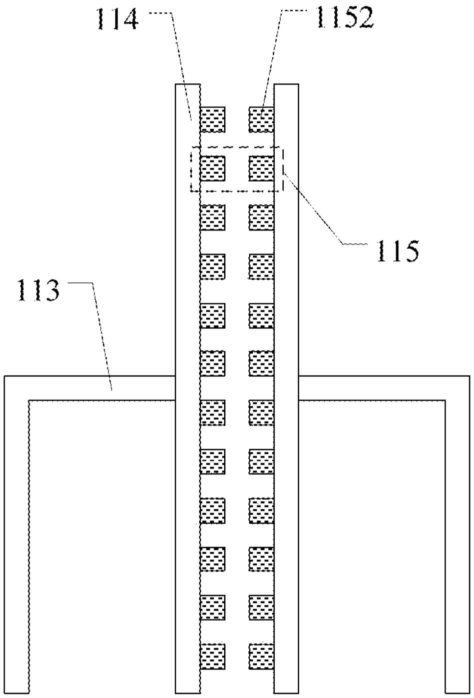
FIG. 3A is a schematic plan view of a first substrate in a tunable phase shifter provided by an embodiment of the present disclosure.
Figure 3B:
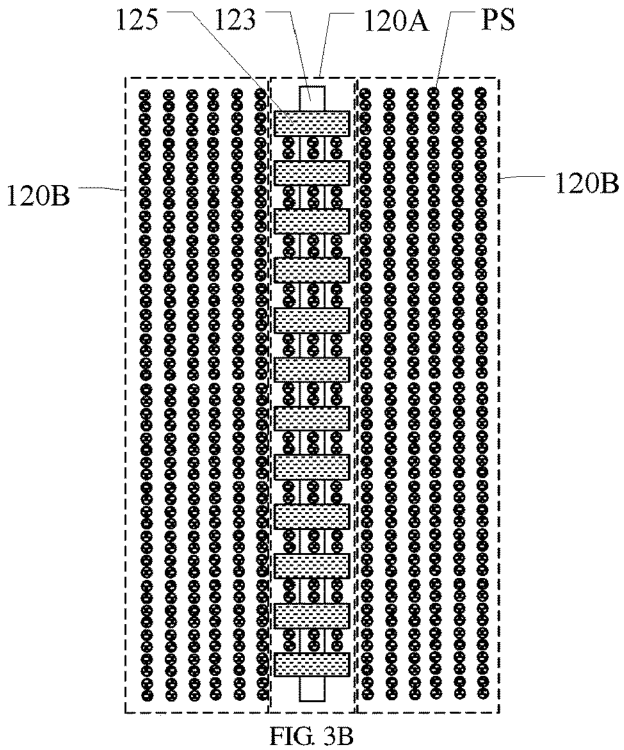
FIG. 3B is a schematic plan view of a second substrate in a tunable phase shifter provided by an embodiment of the present disclosure.

An embodiment of the present disclosure provides a tunable phase shifter. FIG. 2A is a schematic structural view of a tunable phase shifter provided by an embodiment of the present disclosure; FIG. 2B is a schematic structural view of another tunable phase shifter provided by an embodiment of the present disclosure; FIG. 2C is a schematic view of another tunable phase shifter provided by an embodiment of the present disclosure; FIG. 3A is a schematic plan view of a first substrate in a tunable phase shifter provided by an embodiment of the present disclosure; FIG. 3B is a schematic view of a second substrate in a tunable phase shifter provided by an embodiment of the present disclosure.

As shown in FIG. 2A, the tunable phase shifter 100 includes a first substrate 110, a second substrate 120, and a tunable dielectric layer 130 between the first substrate 110 and the second substrate 120; the first substrate 110 includes a first base substrate 112 and a first electrode 115 on the first base substrate 112; the second substrate 120 includes a second base substrate 122 and a second electrode 125 on the second base substrate 122; an orthographic projection of the first electrode 115 on the first base substrate 112 is at least partially overlapped with an orthographic projection of the second electrode 125 on the first base substrate 112, and the sheet resistances of the materials of the first electrode 115 and the second electrode 125 are both less than or equal to 0.024Ω/□. It is noted that, sheet resistance refers to a resistance value per unit thickness and unit area of a conductive material, the sheet resistance is designated as SR. In addition, the material of the above-mentioned tunable dielectric layer may be a material whose dielectric properties can be adjusted by an electric field.

In the tunable phase shifter provided by the embodiment of the present disclosure, because the orthographic projection of the first electrode on the first base substrate is at least partially overlapped with the orthographic projection of the second electrode on the first base substrate, the first electrode and the second electrode can form an overlapping capacitor, in the case that voltages are applied to the first electrode and the second electrode, the dielectric constant of the tunable dielectric layer between the first electrode and the second electrode would change, such that the phases of the electromagnetic waves on the phase shifter change. Moreover, because the sheet resistances of the materials of the first electrode and the second electrode are both less than or equal to 0.024Ω/□, the transmission loss of microwave electromagnetic signals can be reduced. Therefore, the phase shifter has lower transmission loss while changing the phases of the electromagnetic wave signals.

For example, sheet resistance $Rs=\rho/w$, wherein ρ is a resistivity of a thin film material, and w is a thickness of the thin film material. In the embodiment of the present disclosure, in order to reduce the transmission loss of microwave electromagnetic signals, the resistivity ρ of the thin film material is not greater than $2.4*10^{-8}$ Ω/m.

The method of measuring resistivity may adopt direct method, two-probe method, three-probe method, four-probe method, multi-probe array, extended resistance method, Hall measurement, eddy current method, microwave method, capacitive coupling C-V measurement, or the like.

The thickness of the thin film may be measured by direct measurement method or indirect measurement method, the direct measurement method refers to the application of a measuring instrument to directly sense the thickness of the thin film through contact (or light contact), the common direct measurement methods include: spiral micrometry method, precise contour scanning method (step method), scanning electron microscopy (SEM); indirect measurement method refers to converting the relevant physical quantity into the thickness of the thin film through calculation according to a certain corresponding physical relationship, so as to achieve the purpose of measuring the thickness of the thin film. Common indirect measurement methods include: weighing method, capacitance method, resistance method, equal thickness interferometry, variable angle interferometry, and ellipsometry. According to the principles of measurement, the measurement methods may be divided into three categories: weighing method, electrical method and optical method. Common weighing methods include: balance method, quartz method, atomic number determination method; common electrical methods include: resistance method, capacitance method, eddy current method; common optical methods include: equal thickness interferometry, variable angle interferometry, optical absorption method, ellipsometry.

In some examples, the materials of the first electrode and the second electrode may include metals, alloys, conductive metal oxides, or combinations thereof. For example, the metal may be selected from at least one of nickel, platinum, vanadium, chromium, copper, zinc, gold, aluminum, magnesium, calcium, sodium, potassium, titanium, indium, yttrium, lithium, gadolinium, silver, tin, lead, cesium, and barium; alloys may be alloys of one or more of nickel, platinum, vanadium, chromium, copper, zinc, gold, aluminum, magnesium, calcium, sodium, potassium, titanium, indium, yttrium, lithium, gadolinium, silver, tin, lead, cesium, and barium; conductive metal oxides may be at least one selected from a group consisting of zinc oxide, indium oxide, tin oxide, indium tin oxide (ITO), indium zinc oxide (IZO), and fluorine-doped tin oxide. Of course, the embodiments of the present disclosure include but are not limited thereto, and the materials of the first electrode and the second electrode can be set according to the requirement of transmission efficiency.

In some examples, the first electrode may be a single-layer structure or a multi-layer structure; in the case that the first electrode is a multi-layer structure, the multi-layer structure for the first electrode may include lithium fluoride/aluminum (LiF/Al), lithium oxide/aluminum ($Li_2O$/Al), lithium quinoline complex/aluminum, lithium fluoride/calcium (LiF/Ca), or barium fluoride/calcium ($BaF_2$/Ca). Of course, the embodiments of the present disclosure include this but are not limited thereto.

In some examples, the materials of the first electrode and the second electrode may be the same or different.

In some examples, the materials of the first electrode 115 and the second electrode 125 are both copper electrodes; that is to say, both the first electrode and the second electrode are made of copper. Therefore, the tunable phase shifter reduces the cost while reducing the transmission loss for microwave electromagnetic signals.

For example, in the case that the first electrode and the second electrode are copper electrodes each with a thickness of 7.97 microns, the sheet resistances of the first electrode and the second electrode may range from 0.0017Ω/□ to 0.0019Ω/□, such as 0.0017Ω/□, 0.0018Ω/□ or 0.0019Ω/□. It is noted that, the first electrode and the second electrode may be fabricated by electroplating, the electroplating current may be 89 A, and the electroplating time may be 700 seconds.

For example, in the case that the first electrode and the second electrode are copper electrodes each with a thickness of 5.00 microns, the sheet resistances of the first electrode and the second electrode may range from 0.0027Ω/□ to 0.0031Ω/□, such as 0.0027Ω/□, 0.0028Ω/□, 0.0029Ω/□, 0.0030Ω/□ or 0.0031Ω/□. It is noted that, the first electrode and the second electrode may be fabricated by electroplating, and the electroplating current may be 89 A, the electroplating time may be 439 seconds.

For example, in the case that the first electrode and the second electrode are copper electrodes each with a thickness of 2.39 microns, the sheet resistances of the first electrode and the second electrode may range from 0.0067Ω/□ to 0.0073Ω/□, such as 0.0067Ω/□, 0.0068Ω/□, 0.0069Ω/□, 0.0070Ω/□, 0.0071Ω/□, 0.007Ω/□, 0.0073Ω/□. It is noted that, the first electrode and the second electrode may be fabricated by electroplating, and the electroplating current may be 89 A, the electroplating time may be 176 seconds.

For example, in the case that the first electrode and the second electrode are copper electrodes each with a thickness of 5.02 microns, the sheet resistances of the first electrode and the second electrode may range from 0.0027Ω/□ to 0.0031Ω/□, such as 0.0027Ω/□, 0.0028Ω/□, 0.0029Ω/□, 0.0030Ω/□ or 0.0031Ω/□. It is noted that, the first electrode and the second electrode may be fabricated by electroplating, and the electroplating current may be 89 A, the electroplating time may be 439 seconds.

For example, in the case that the first electrode and the second electrode are copper electrodes each with a thickness of 5.12 microns, the sheet resistances of the first electrode and the second electrode may range from 0.0025Ω/□ to 0.0030Ω/□, such as 0.0025Ω/□, 0.0026Ω/□, 0.0027Ω/□, 0.0028Ω/□, 0.0029Ω/□, or 0.0030Ω/□. It is noted that, the first electrode and the second electrode may be fabricated by electroplating, and the electroplating current may be 89 A, the electroplating time may be 439 seconds.

In some examples, as shown in FIG. 2B and FIG. 2C, the above-mentioned tunable dielectric layer 130 may be a liquid crystal layer. Liquid crystal material is a kind of material aggregation state between solid and liquid, due to the dielectric anisotropy and the property that molecules can rotate freely of the liquid crystal material, the dielectric constant of the material in this state can be changed and thus the phase constant can be changed in the case that the liquid crystal material is subjected to an external excitation (electric field or magnetic field). Therefore, the tunable phase shifter can quickly change phase, and also has the advantages of simple manufacturing process, small volume and weight, and low cost.

In some examples, the above-mentioned liquid crystal layer may be nematic liquid crystal, cholesteric liquid crystal, smectic liquid crystal, or the like, or may be negative liquid crystal or positive liquid crystal.

In some examples, the materials of the first electrode and the second electrode may be the same or different.

In some examples, as shown in FIG. 2A, FIG. 2B and FIG. 2C, the thickness of the first electrode 115 in the direction perpendicular to the first base substrate 112 ranges from 1.5 to 5 microns; the thickness of the second electrode 125 in the direction perpendicular to the second base substrate 122 ranges from 1.5 to 5 microns. As such, both the first electrode and the second electrode have a relatively large thickness, such that the resistances of the first electrode and the second electrode can be reduced. Of course, the embodiments of the present disclosure include this but are not limited thereto, and the thicknesses of the first electrode and the second electrode can be adjusted according to the requirement of the transmission efficiency of the tunable phase shifter.

In some examples, as shown in FIG. 2A, FIG. 2B and FIG. 2C, the first substrate 110 further includes a first protection layer 116 and a first alignment layer 117, the first protection layer 116 is located on a side of the first electrodes 115 away from the base substrate 112, and the first alignment layer 117 is located on a side of the first protection layer 116 away from the first base substrate 112. Through forming the first protection layer on the side of the first electrodes away from the first base substrate, the tunable phase shifter can, on the one hand, prevent the first electrodes from being oxidized, thereby improving the stability of the product, and on the other hand, the flatness of the first substrate can be improved through the first protection layer, thereby improving the uniformity of the phase shift amounts. It should be noted that, the above-mentioned "phase shift amounts" refers to phase change amounts of electromagnetic waves caused by the tunable phase shifter.

For example, the material of the first protection layer may be selected from one or more of silicon nitride, silicon oxide, silicon oxynitride, titanium oxide and aluminum oxide, so as to have a better effect of preventing water and oxygen erosion. Of course, the material of the first protection layer can also be other organic or inorganic materials that have the effect of preventing water and oxygen erosion. For example, the thickness of the first protection layer may range from 1000 angstroms to 2000 angstroms, so as to have a better planarization effect. Of course, the embodiments of the present disclosure include this but are not limited thereto, and the first protection layer may also adopt other thicknesses, as long as the planarization effect can be achieved.

In some examples, as shown in FIG. 2A, FIG. 2B and FIG. 2C, the second substrate 120 further includes a second protection layer 126 and a second alignment layer 127, and the second protection layer 126 is located on a side of the second electrodes 125 away from the second base substrate 122, the second alignment layer 127 is located on a side of the second protection layer 126 away from the second base substrate 122. Through forming the second protection layer on the side of the second electrodes away from the second base substrate, the tunable phase shifter can, on the one hand, prevent the second electrodes from being oxidized, thereby improving the stability of the product, and on the other hand, the flatness of the second substrate can be improved through the second protection layer, thereby improving the uniformity of the phase shift amounts.

For example, the material of the second protection layer may be selected from one or more of silicon nitride, silicon oxide, silicon oxynitride, titanium oxide and aluminum oxide, so as to have a better effect of preventing water and oxygen erosion. Of course, the material of the second protection layer can also be other organic or inorganic materials that have the effect of preventing water and oxygen erosion.

For example, the thickness of the second protection layer may range from 1000 angstroms to 2000 angstroms, so as to have a better planarization effect. Of course, the embodiments of the present disclosure include this but are not limited thereto, and the second protection layer may also adopt other thicknesses, as long as the planarization effect can be achieved.

In some examples, as shown in FIG. 3A, the first substrate 110 includes a plurality of first electrodes 115 spaced apart from each other and a first connection electrode 114 connected to the plurality of first electrodes 115. As such, the plurality of first electrodes can be connected through the first connection electrode, thereby improving the uniformity of the voltages on the plurality of first electrodes, and further improving the uniformity of the phase shift amounts of the tunable phase shifter.

In some examples, as shown in FIG. 3B, the second substrate 120 includes a plurality of second electrodes 125 spaced apart from each other and a second signal line 123, and the second signal line 123 is electrically connected to the second electrodes 125. The second signal line 123 is located on a side of the plurality of second electrodes 125 close to the second base substrate 122, and an orthographic projection of the second signal line 123 on the second base substrate 122 is overlapped with orthographic projections of the plurality of second electrodes 125 on the second base substrate 122.

In some examples, as shown in FIG. 2A, FIG. 2B and FIG. 2C, the plurality of first electrodes 115 and the plurality of second electrodes 125 are disposed in one-to-one correspondence relationship, and an orthographic projection of the first electrode 115 on the first base substrate 112 is at least partially overlapped with an orthographic projection of a corresponding second electrode 125 on the first base substrate 112. As such, overlapping capacitors can be formed by the first electrodes and the second electrodes that are correspondingly disposed. In addition, gaps or openings may be formed between adjacent first electrodes, which facilitates the transmission of electromagnetic waves.

In some examples, as shown in FIG. 2A, FIG. 2B and FIG. 2C, the first electrode 115 directly faces the corresponding second electrode 125; for example, the overlapping distance in the arrangement direction of the plurality of first electrodes 115 of the orthographic projection of the first electrode 115 on the first base substrate 112 and the orthographic projection of the corresponding second electrode 125 on the first base substrate 112 is greater than 80% of the size of the first electrode 115 or the second electrode 125 in the arrangement direction of the plurality of first electrodes 115. As such, the tunable phase shifter can better control the phase shift amounts.

In some examples, as shown in FIG. 2A, FIG. 2B and FIG. 2C, the overlapping distance in the arrangement direction of the plurality of first electrodes 115 of the orthographic projection of the first electrode 115 on the first base substrate 112 and the orthographic projection of the corresponding second electrode 125 on the first base substrate 112 is greater than 90% of the size of the first electrode 115 or the second electrode 125 in the arrangement direction of the plurality of first electrodes 115, thereby better controlling the phase shift amounts.

In some examples, the size (i.e., width) of the first electrode 115 in the arrangement direction of the plurality of first electrodes 115 ranges from 100 microns to 500 microns; the size (i.e., width) of the second electrode 115 in the arrangement direction of the plurality of second electrodes 125 ranges from 100 to 500 microns.

For example, the width of the first electrode may be 100 microns, 200 microns, 300 microns, 400 microns or 500 microns; the width of the second electrode may be 100 microns, 200 microns, 300 microns, 400 microns or 500 microns.

In some examples, the size of each first electrode 115 in the arrangement direction of the plurality of first electrodes 115 ranges from 120 mm to 180 mm, such as 150 mm; that is to say, the width of each first electrode ranges from 120 mm to 180 mm, such as 150 mm.

In some examples, the size of each second electrode 125 in the arrangement direction of the plurality of second electrodes 125 ranges from 120 mm to 180 mm, such as 150 mm; that is to say, the width of each second electrode ranges from 120 mm to 180 mm, such as 150 mm.

In some examples, as shown in FIG. 2A and FIG. 2B, the shape of the cross section of the first electrode 115 cut by a plane perpendicular to the first base substrate 112 is a trapezoid. As shown in FIG. 2C, the shape of the cross section of the first electrode 115 cut by a plane perpendicular to the first base substrate 112 is a rectangle. In this case, the angle range of the bottom angle θ of the cross section away from the tunable dielectric layer 130 is 70 degrees to 90 degrees. For example, considering the process conditions, the angle of the bottom angle θ may be 70 degrees, 80 degrees or 90 degrees. Because the angle range of the bottom angle θ of the cross section away from the tunable dielectric layer 130 is 70 to 90 degrees, the slope of the cross section is relatively large, so that the area of the surface of the first electrode close to the tunable dielectric layer is relatively large, which can improve the performance of the overlapping capacitor formed by the first electrode and the second electrode. As such, the tunable phase shifter can further reduce the transmission loss of the microwave electromagnetic signals.

In some examples, as shown in FIG. 2C, the angle range of the bottom angle θ of the cross section of the first electrode 115 away from the tunable dielectric layer 130 is 90 degrees. In this case, the tunable phase shifter can further reduce the transmission loss of microwave electromagnetic signals.

In some examples, as shown in FIG. 2A and FIG. 2B, the shape of the cross section of the second electrode 125 cut by a plane perpendicular to the second base substrate 122 is a trapezoid, as shown in FIG. 2C, the shape of the cross section of the second electrode 125 cut by a plane perpendicular to the second base substrate 122 is a rectangle. In this case, the angle range of the bottom angle θ of the cross section away from the tunable dielectric layer 130 is 70 degrees to 90 degrees. For example, considering the process conditions, the angle of the bottom angle θ may be 70 degrees, 80 degrees or 90 degrees. Similarly, because the angle range of the bottom angle θ of the cross section away from the tunable dielectric layer 130 is 70 degrees to 90 degrees, the slope of the cross section is relatively large, so that the area of the surface of the second electrode close to the tunable dielectric layer is relatively large, which can improve the performance of the overlapping capacitor formed by the first electrode and the second electrode. As such, the tunable phase shifter can further reduce the transmission loss of the microwave electromagnetic signals.

In some examples, as shown in FIG. 2C, the angle range of the bottom angle θ of the cross section of the second electrode 125 away from the tunable dielectric layer 130 is 90 degrees. In this case, the tunable phase shifter can further reduce the transmission loss of microwave electromagnetic signals.

Figure 3C:
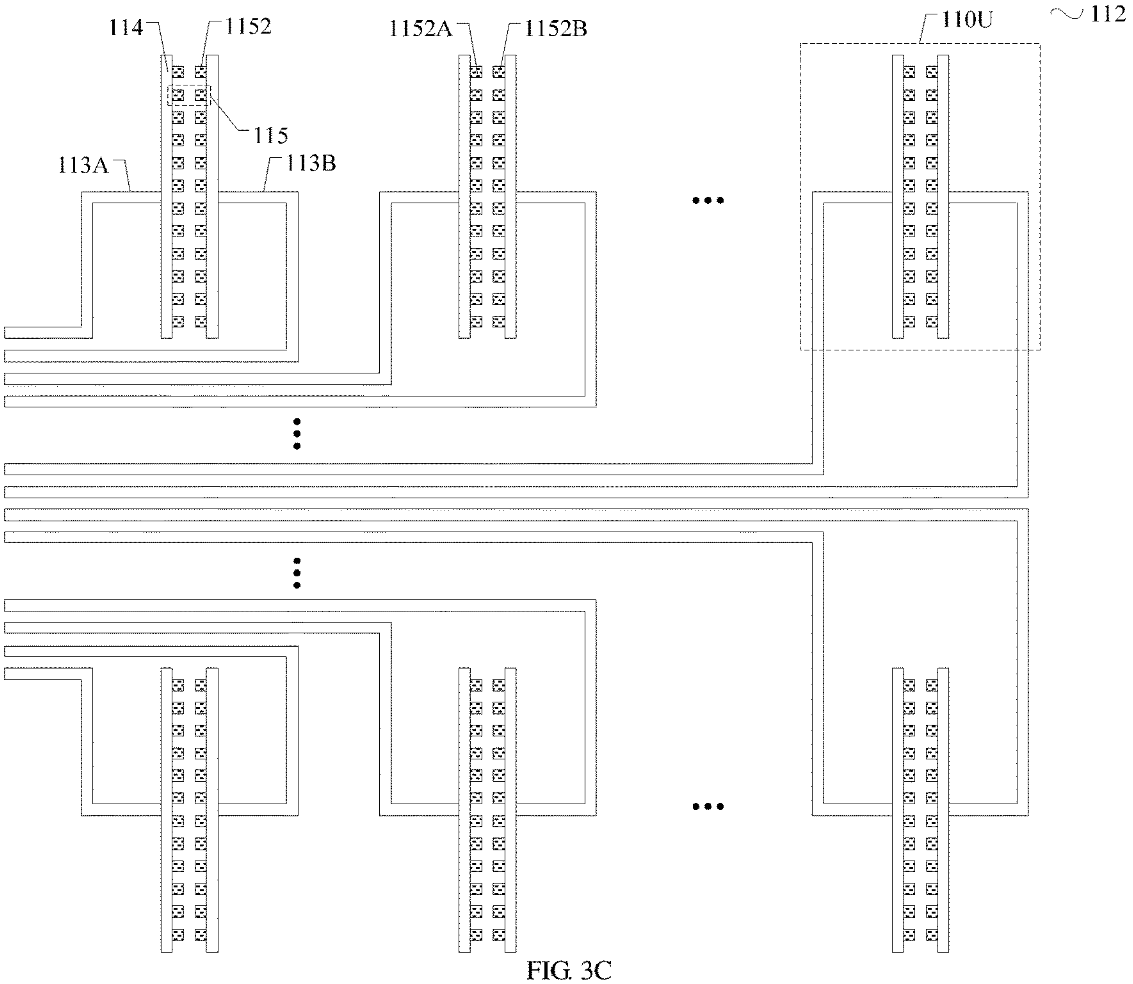
FIG. 3C is a schematic plan view of a first substrate in a tunable phase shifter provided by an embodiment of the present disclosure.
Figure 3D:
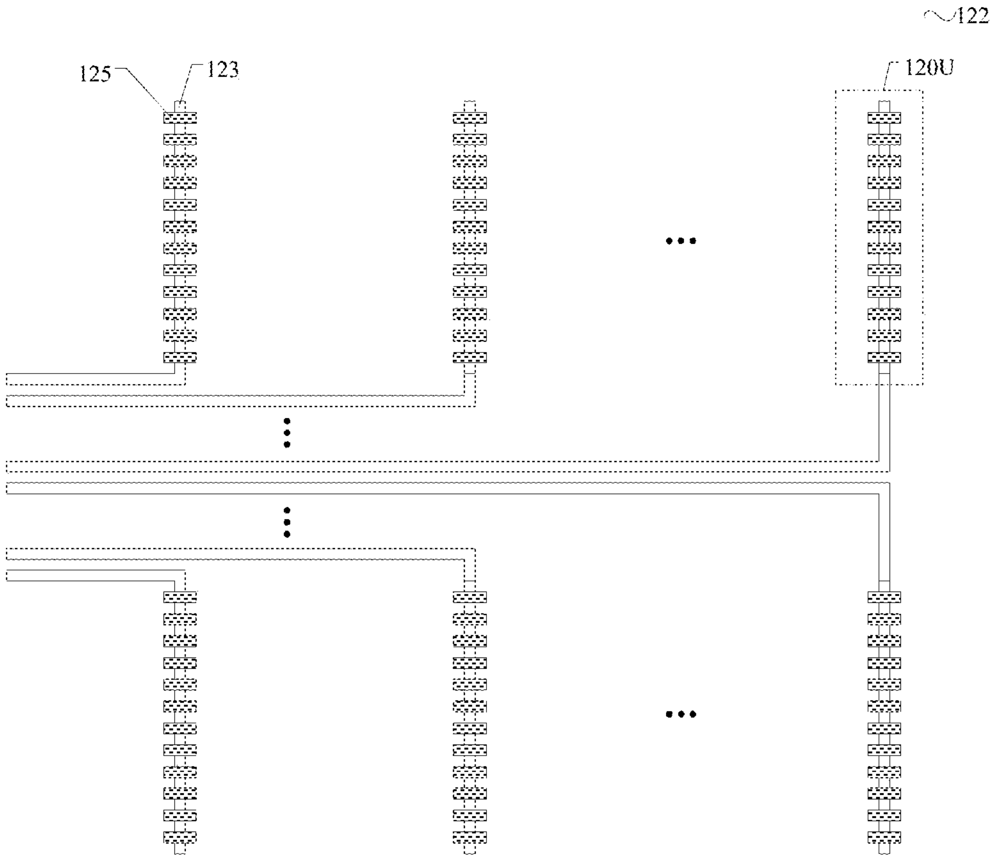
FIG. 3D is a schematic plan view of a second substrate in a tunable phase shifter according to an embodiment of the present disclosure.

FIG. 3C is a schematic plan view of a first substrate in another tunable phase shifter provided by an embodiment of the present disclosure; FIG. 3D is a schematic plan view of a second substrate in another tunable phase shifter provided by an embodiment of the present disclosure.

As shown in FIG. 3C and FIG. 3D, the tunable phase shifter 100 includes a plurality of first tunable phase shifter units 110U on the first base substrate 112 and a plurality of second tunable phase shifter units 120U on the second base substrate 122, the plurality of first tunable phase shifter units 110U and the plurality of second tunable phase shifter units 120U are in one-to-one correspondence, and form complete tunable phase shifter units. According to the requirements of phase shifting accuracy, the number of tunable phase shifter units may be more than 2, such as 2, 5, 10, 21, 35, 43, 56 or hundreds, such as 512 or 4096, or the like.

As shown in FIG. 3C and FIG. 3D, in the first tunable phase shifter unit 110U, the first electrode 115 includes two sub-electrode parts 1152 (e.g., a first sub-electrode part 1152A and a second sub-electrode part 1152B) that are disposed as facing each other. In this case, the first substrate 110 includes two first connection electrodes 114 and two first signal lines 113. The first signal lines 113A and 113B can be loaded with the same voltage or different voltages, and the first signal lines 113A and 113B of each tunable phase shifter unit 110U can be connected to the same IC or to different ICs.

As shown in FIG. 3C and FIG. 3D, the two facing sub-electrode parts 1152 (FIG. 3C) may be loaded with the same electrical signal, or may be loaded with different electrical signals. For example, the voltages are the same or different, and the frequencies are the same or different, but the electrical signal need to form a differential signal with the electrical signal of the second tunable phase shifting unit 120U (FIG. 3D). For example, a low frequency signal may be applied to the first tunable phase shifter unit 110U, and a high frequency signal may be applied to the second tunable phase shifter unit 120U, so as to form a differential signal therebetween for microwave signal transmission.

As shown in FIG. 3C and FIG. 3D, the materials of the two facing sub-electrode parts 1152 are the same or different, for example, are metals, alloys, conductive metal oxides or combinations thereof. For example, the metals may be selected from at least one of nickel, platinum, vanadium, chromium, copper, zinc, gold, aluminum, magnesium, calcium, sodium, potassium, titanium, indium, yttrium, lithium, gadolinium, silver, tin, lead, cesium, and barium; alloys may be alloys of one or more of nickel, platinum, vanadium, chromium, copper, zinc, gold, aluminum, magnesium, calcium, sodium, potassium, titanium, indium, yttrium, lithium, gadolinium, silver, tin, lead, cesium, and barium; conductive metal oxides may be at least one selected from the group consisting of zinc oxide, indium oxide, tin oxide, indium tin oxide (ITO), indium zinc oxide (IZO), and fluorine-doped tin oxide.

In some examples, as shown in FIG. 2A, FIG. 2B, FIG. 2C, FIG. 3A and FIG. 3B, the tunable phase shifter 100 further includes a plurality of spacers PS (FIGS. 2A-2C and 3B) located between the first substrate 110 and the second substrate 120 to maintain the interval between the first substrate 110 and the second substrate 120; at least one spacer PS is provided between two adjacent second electrodes 125, so that the uniformity of the thickness between the first substrate 110 and the second substrate 120 can be better maintained, thereby ensuring the uniformity of the phase shift amounts of the tunable phase shifter.

In some examples, as shown in FIG. 3B, the second substrate 120 includes an electrode region 120A and a peripheral region 120B on the periphery of the electrode region 120A, the second electrodes 125 are located in the electrode region 120A, and the peripheral region 120B is provided with multiple spacers PS arranged in an array. As such, through providing multiple spacers arranged in an array in the peripheral region as well, the tunable phase shifter can avoid deformation of the first substrate and the second substrate at the edge of the electrode region, thereby better maintaining the thickness uniformity between the first substrate and the second substrate, and further ensuring the uniformity of the phase shift amounts of the tunable phase shifter.

In some examples, the maximum dimension of the orthographic projection of the spacer PS on the first base substrate 112 in a direction parallel to the first base substrate 112 is D1, and the distance between two adjacent ones of the spacers PS is D2, the ratio of D2 to D1 ranges from 6 to 12. As such, through setting the above-mentioned distance between two adjacent spacers PS, the tunable phase shifter can improve the uniformity of the thickness of the tunable dielectric layer between the first substrate and the second substrate, thereby improving the uniformity of the phase shift amounts.

For example, the maximum dimension D1 in a direction parallel to the first base substrate 112 of the orthographic projection of the spacer PS on the first base substrate 112 ranges from 40 microns to 60 microns, such as 50 microns. It should be noted that, in the case that the shape of the orthographic projection of the spacer on the first base substrate is a circle, the above-mentioned maximum dimension D1 may be the diameter of the circle; in the case that the shape of the orthographic projection of the spacer on the first base substrate is an ellipse, the above-mentioned maximum dimension D1 may be the major axis dimension of the ellipse; in the case that the shape of the orthographic projection of the spacer on the first base substrate is a polygon, the above-mentioned maximum dimension D1 may be a length of the largest diagonal of the polygon.

In some examples, the distance D2 between two adjacent spacers PS ranges from 360 to 480 microns, such as 400 microns.

In some examples, as shown in FIG. 2A, FIG. 2B and FIG. 2C, the ratio of the height of the spacer PS in the direction perpendicular to the second base substrate 122 to the distance between the first substrate 110 and the second substrate 120 (i.e., cell thickness) ranges from (40/30) to (10.6/4.6), that is, 1.33 to 2.30. As such, the tunable phase shifter can achieve better phase shifting capability and has lower transmission loss.

In some examples, as shown in FIG. 2A, FIG. 2B and FIG. 2C, the ratio of the thickness of the second electrode 125 in the direction perpendicular to the second base substrate 122 to the height of the spacer PS in the direction perpendicular to the second base substrate 122 ranges from (3/10.6) to (5/40), that is, 0.125 to 0.28. As such, the tunable phase shifter can achieve better phase shifting capability and has lower transmission loss.

In some examples, as shown in FIG. 2A, FIG. 2B and FIG. 2C, the ratio of the thickness of the second electrode 125 in the direction perpendicular to the second base substrate 122 to the distance between the first substrate 110 and the second substrate 120 (i.e., cell thickness) ranges from (3/4.6) to (5/30), that is, 0.17 to 0.65. As such, the tunable phase shifter can achieve better phase shifting capability and has lower transmission loss.

In some examples, as shown in FIG. 2A, FIG. 2B, FIG. 2C, FIG. 3A and FIG. 3B, the first substrate 110 further includes a first signal line 113, and the first signal line 113 is electrically connected to the first electrodes 115, the second substrate 120 includes a second signal line 123, and the second signal line 123 is electrically connected to the second electrodes 125.

For example, the materials of the first signal line and the second signal line may adopt transparent metal oxides, such as indium tin oxide (ITO). As such, the first signal line and the second signal line not only have good electrical conductivity, but also can further avoid the transmission of electromagnetic waves from being adversely affected.

In some examples, as shown in FIG. 3A, each first electrode 115 includes two sub-electrode parts 1152 that are disposed as facing each other; In this case, the first substrate 110 includes two first connection electrodes 114 and two first signal lines 113; one of the two first connection electrodes 114 is connected to the sub-electrode parts 1152 at the left side of the plurality of first electrodes 115, and the other one of the two first connection electrodes 114 is connected to the sub-electrode parts 1152 at the right side of the plurality of first electrodes 115, the two first signal lines 113 are respectively connected to the two first connection electrodes 114, so as to provide driving voltages to the two first connection electrodes 114.

In some examples, as shown in FIG. 3B, an orthographic projection of the second signal line 123 on the second base substrate 122 is overlapped with orthographic projections of the plurality of second electrodes 125 on the second base substrate 122. The plurality of second electrodes 125 may be located on a side of the second signal line 123 away from the second base substrate 122.

In some examples, as shown in FIG. 2A, FIG. 2B and FIG. 2C, because the thicknesses of the first electrodes 115 are relatively thick, a region between two adjacent first electrodes 115 is a recessed region, and the spacer PS is disposed in the recessed region. In this case, an orthographic projection of the spacer PS on a reference line perpendicular to the first base substrate 112 is overlapped with an orthographic projection of the first electrode 115 on the reference line.

In some examples, as shown in FIG. 2A, FIG. 2B and FIG. 2C, because the thicknesses of the second electrodes 125 are relatively thick, a region between two adjacent second electrodes 125 is a recessed region, and the spacer PS is disposed in the recessed region. In this case, an orthographic projection of the spacer PS on the reference line perpendicular to the second base substrate 122 is overlapped with an orthographic projection of the second electrode 125 on the reference line.

In some examples, the first base substrate and the second base substrate may be substrates including insulating materials (e.g., insulating transparent substrates). The substrate may include glass; a polymer such as polyester (e.g., polyethylene terephthalate (PET), polyethylene naphthalate (PEN)), polycarbonate, polyacrylate, polyimide, polyamide-imide, or combinations thereof; polysiloxane (e.g., PDMS); an inorganic material such as $Al_2O_3$, ZnO, or combinations thereof; or combinations thereof; the first substrate and the second substrate may be made from silicon wafers, but the disclosure is not limited thereto. The first substrate and the second substrate may be made of the same material or different materials.

In some examples, the lower the dielectric losses Df of the first base substrate and the second base substrate, the better; for example, the dielectric losses Df of the first base substrate and the second base substrate are less than 0.003. In addition, the lower the dielectric loss Df of the dielectric layer, the better; for example, the dielectric loss Df of the dielectric layer is less than 0.005.

Figure 4:
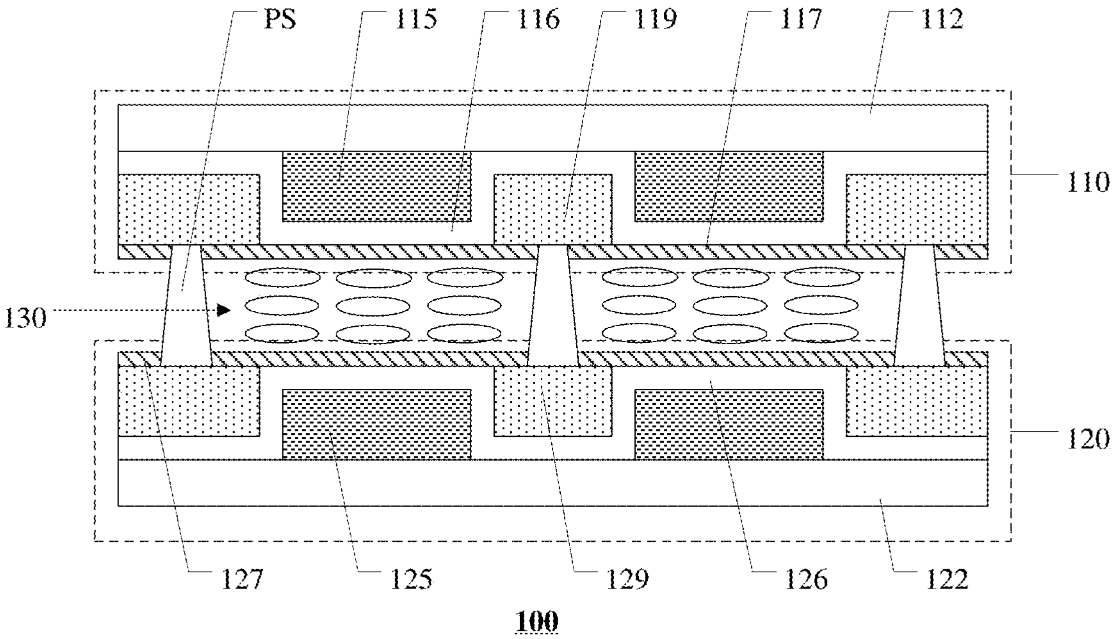
FIG. 4 is a schematic view of another tunable phase shifter provided by an embodiment of the present disclosure.
Figure 5A:
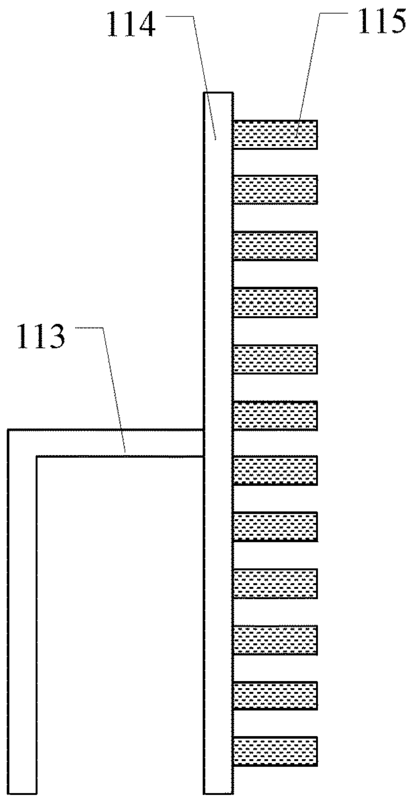
FIG. 5A is a schematic plan view of a first substrate in another tunable phase shifter according to an embodiment of the present disclosure.
Figure 5B:
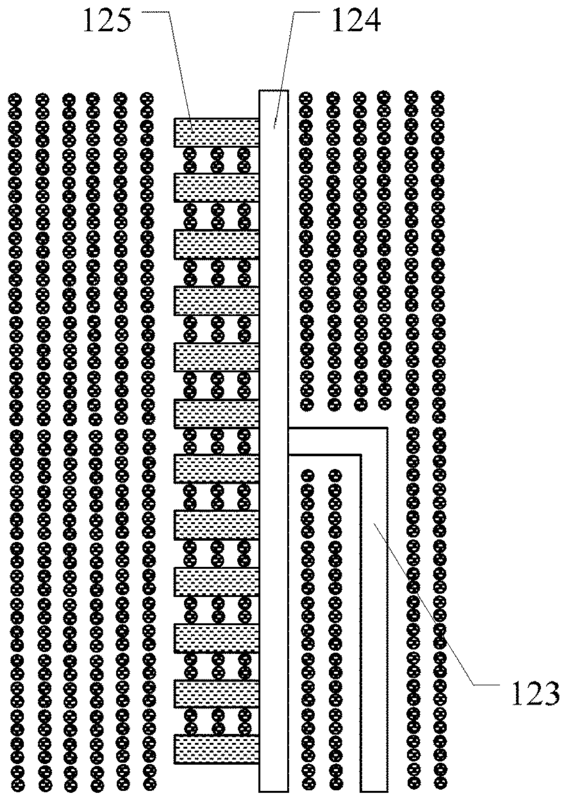
FIG. 5B is a schematic plan view of a second substrate in another tunable phase shifter according to an embodiment of the present disclosure.

FIG. 4 is a schematic view of another tunable phase shifter provided by an embodiment of the present disclosure; FIG. 5A is a schematic plan view of a first substrate in another tunable phase shifter provided by an embodiment of the present disclosure; FIG. 5B is a schematic plan view of a second substrate in another tunable phase shifter provided by an embodiment of the present disclosure.

As shown in FIG. 4, the tunable phase shifter 100 includes a first substrate 110, a second substrate 120 and a liquid crystal layer 130 between the first substrate 110 and the second substrate 120. For example, the first substrate and the second substrate may form a liquid crystal cell through a cell-assembling process, and then a liquid crystal material is injected into the liquid crystal cell to form the above-mentioned liquid crystal layer.

As shown in FIG. 4 and FIG. 5A, the first substrate 110 includes a first base substrate 112, a plurality of first electrodes 115, a first connection electrode 114, a first protection layer 116 and a first alignment layer 117; the plurality of first electrodes 115 are spaced apart from each other, the first connection electrode 114 is connected to the plurality of first electrodes 115, the plurality of first electrodes 115 and the first connection electrode 114 are located on the first base substrate 112, and the first protection layer 116 is located on a side of the plurality of first electrodes 115 and the first connection electrode 114 away from the first base substrate 112, and the first alignment layer 117 is located on a side of the first protection layer 116 away from the first base substrate 112.

As shown in FIG. 4 and FIG. 5B, the second substrate 120 includes a second base substrate 122, a plurality of second electrodes 125, a second connection electrode 124, a second protection layer 126 and a second alignment layer 127; the plurality of second electrodes 125 are spaced apart from each other, the second connection electrode 124 is connected to the plurality of second electrodes 125, and the plurality of second electrodes 125 and the second connection electrode 124 are located on the second base substrate 122, the second protection layer 126 is located on a side of the plurality of second electrodes 125 and the second connection electrode 124 away from the second base substrate 122, the second alignment layer 127 is located on a side of the second protection layer 126 away from the second base substrate 122.

As shown in FIG. 4, FIG. 5A and FIG. 5B, orthographic projections of the first electrodes 115 on the first base substrate 112 are at least partially overlapped with orthographic projections of the second electrodes 125 on the first base substrate 112, a material of at least one of the first electrode 115 and the second electrode 125 includes a copper electrode. That is to say, at least one of the first electrode 115 and the second electrode 125 is made of copper.

In the tunable phase shifter provided by the embodiments of the present disclosure, because the material of at least one of the first electrode and the second electrode includes a copper electrode, the copper electrode has a relatively high conductivity, thereby reducing the transmission loss of microwave electromagnetic signals. As such, the tunable phase shifter has lower transmission loss while changing the phases of the electromagnetic wave signals. On the other hand, through forming the first protection layer on the side of the first electrodes away from the first base substrate, the tunable phase shifter can, on the one hand, prevent the first electrodes from being oxidized, thereby improving the stability of the product, and on the other hand, the flatness of the first substrate can further be improved through the first protection layer, thereby improving the uniformity of the phase shift amounts; through forming the second protection layer on the side of the second electrodes away from the second base substrate, the tunable phase shift can, on the one hand, prevent the second electrodes from being oxidized, thereby improving the stability of the product, and on the other hand, the flatness of the second substrate can further be improved through the second protection layer, thereby improving the uniformity of the phase shift amounts.

In some examples, as shown in FIG. 4, FIG. 5A and FIG. 5B, the first substrate 110 further includes a first planarization filling structure 119, and the first planarization filling structure 119 is located between adjacent ones of the first electrodes 115, the thickness of the first planarization filling structure 119 in the direction perpendicular to the first base substrate 112 is approximately equal to the thickness of the first electrode 115 in the direction perpendicular to the first base substrate 112. As such, the first planarization filling structure can greatly improve the flatness of the entire first substrate, thereby improving the uniformity of the phase shift amounts of the tunable phase shifter.

For example, the material of the first planarization filling structure 119 includes an optical adhesive, because the optical adhesive is easy to coat and facilitates the transmission of electromagnetic waves. Of course, the embodiments of the present disclosure include this but are not limited thereto, and other suitable materials (e.g., photoresist and photocurable adhesive) may also be used for the first planarization filling structure.

In some examples, as shown in FIG. 4, FIG. 5A and FIG. 5B, the second substrate 120 further includes a second planarization filling structure 129, and the second planarization filling structure 129 is located between adjacent ones of the second electrodes 125, the thickness of the second planarization filling structure 129 in the direction perpendicular to the second base substrate 122 is approximately equal to the thickness of the second electrode 115 in the direction perpendicular to the second base substrate 122. As such, the second planarization filling structure can greatly improve the flatness of the entire second substrate, thereby improving the uniformity of the phase shift amounts of the tunable phase shifter.

For example, the material of the second planarization filling structure 129 includes an optical adhesive, because the optical adhesive is easy to coat and facilitates the transmission of electromagnetic waves. Of course, the embodiments of the present disclosure include this but are not limited thereto, and other suitable materials (e.g., photoresist and photocurable adhesive) may also be used for the second planarization filling structure.

In some examples, as shown in FIG. 4, FIG. 5A and FIG. 5B, because the first planarization filling structure 119 and the second planarization filling structure 129 greatly improve the flatness of the first substrate 110 and the second substrate 120, respectively, the height of the spacer PS in the direction perpendicular to the second base substrate 122 is approximately equal to the distance between the first substrate 110 and the second substrate 120 (i.e., the cell thickness); that is to say, the ratio of the height of the spacer PS in the direction perpendicular to the second base substrate 122 to the distance between the first substrate 110 and the second substrate 120 (i.e., cell thickness) ranges from 1 to 1.1.

For example, the ratio of the height of the spacer PS in the direction perpendicular to the second base substrate 122 to the distance between the first substrate 110 and the second substrate 120 (i.e., cell thickness) is equal to 1. In some examples, as shown in FIG. 4, FIG. 5A and FIG. 5B, a plurality of first electrodes 115 and a plurality of second electrodes 125 are disposed in one-to-one correspondence, and the orthographic projection of the first electrode 115 on the first base substrate 112 is at least partially overlapped with the orthographic projection of the corresponding second electrode 125 on the first base substrate 112. As such, overlapping capacitors can be formed by the correspondingly disposed first electrodes and second electrodes. In addition, gaps or openings may be formed between adjacent ones of the first electrodes, which facilitates the transmission of electromagnetic waves.

In some examples, as shown in FIG. 4, FIG. 5A and FIG. 5B, the first electrode 115 directly faces the corresponding second electrode 125; for example, the overlapping distance in the arrangement direction of the plurality of first electrodes 115 of the orthographic projection of the first electrode 115 on the first base substrate 112 and the orthographic projection of the corresponding second electrode 125 on the first base substrate 112 is greater than 90% of the dimension of the first electrode 115 or the second electrode 125 in the arrangement direction of the plurality of first electrodes 115. As such, the tunable phase shifter can better control the phase shift amounts.

In some examples, as shown in FIG. 5A, the first substrate 110 further includes a first signal line 113, the first signal line 113 is electrically connected to the first connection electrode 114, and is located on a side of the first connection electrode 114 away from the plurality of first electrodes 115.

In some examples, as shown in FIG. 5B, the second substrate 120 further includes a second signal line 123, the second signal line 123 is electrically connected to the second connection electrode 124, and located on a side of the second connection electrode 124 away from the plurality of second electrodes 125.

Figure 6A:
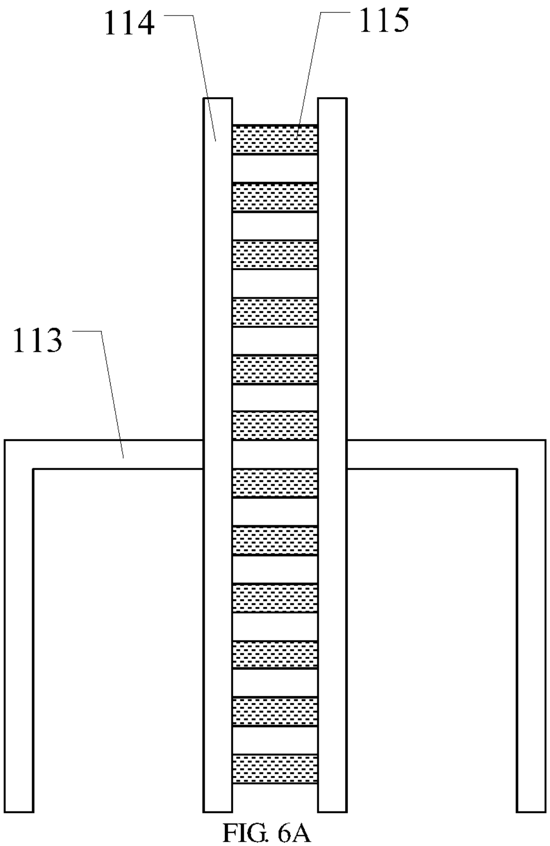
FIG. 6A is a schematic plan view of a first substrate in another tunable phase shifter provided by an embodiment of the present disclosure.
Figure 6B:
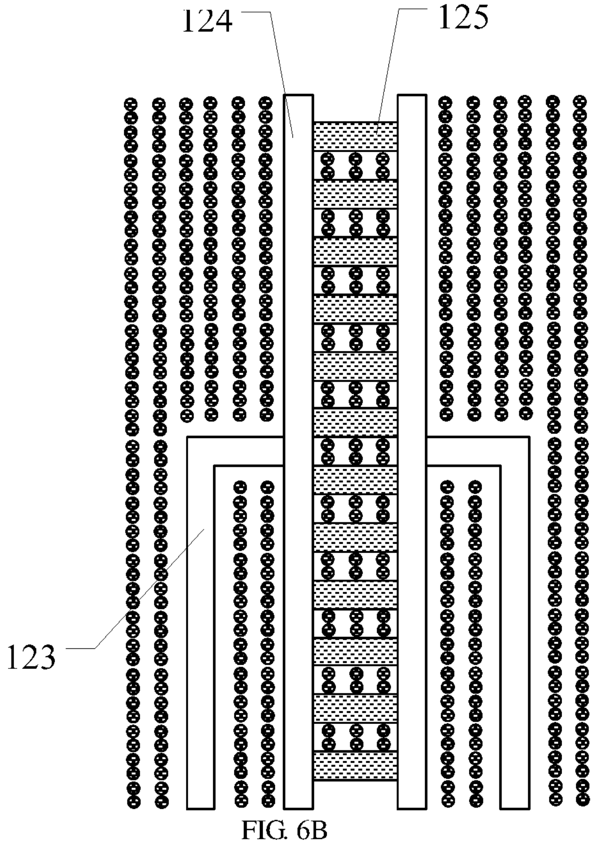
FIG. 6B is a schematic plan view of a second substrate of another tunable phase shifter provided by an embodiment of the present disclosure.

FIG. 6A is a schematic plan view of a first substrate of another tunable phase shifter provided by an embodiment of the present disclosure; FIG. 6B is a schematic plan view of a second substrate of another tunable phase shifter provided by an embodiment of the present disclosure.

As shown in FIG. 6A, the first substrate 110 includes two first connection electrodes 114 and two first signal lines 113; one of the two first connection electrodes 114 is located on a side of the plurality of first electrodes 115, and is connected to the plurality of first electrodes 115; the other one of the two first connection electrodes 114 is located on another side of the plurality of first electrodes 115, and is connected to the plurality of first electrodes 115; the two first signal lines 113 are respectively connected to the two first connection electrodes 114, so as to provide driving voltages to the two first connection electrodes 114.

As shown in FIG. 6A and FIG. 6B, the second substrate 120 includes two second connection electrodes 124 and two second signal lines 123; one of the two second connection electrodes 124 is located on a side of the plurality of second electrodes 125, and is connected to the plurality of second electrodes 125; the other one of the two first connection electrodes 114 is located on another side of the plurality of first electrodes 115, and is connected to the plurality of first electrodes 115. The two first signal lines 113 are respectively connected to the two first connection electrodes 114, so as to provide driving voltages to the two first connection electrodes 114.

Figure 7A:
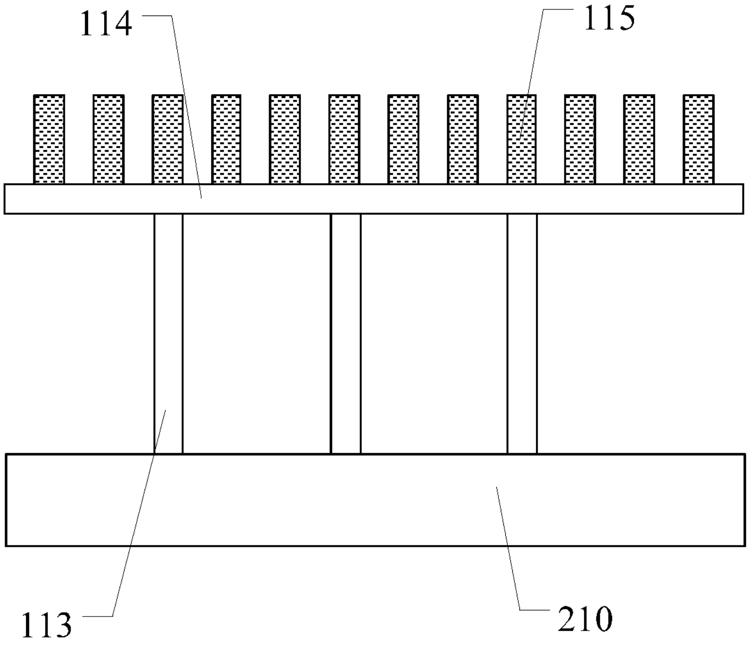
FIG. 7A is a schematic plan view of a first substrate in another tunable phase shifter provided by an embodiment of the present disclosure.
Figure 7B:
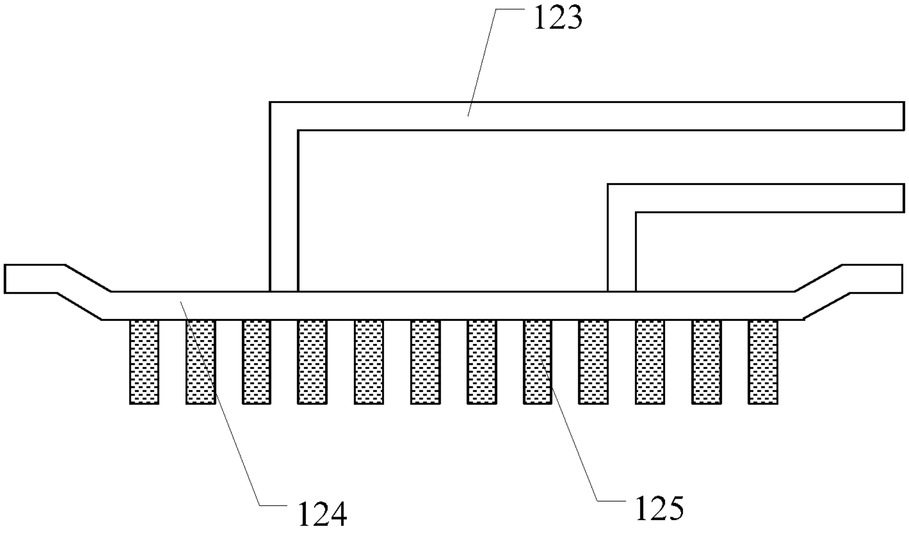
FIG. 7B is a schematic plan view of a second substrate in another tunable phase shifter provided by an embodiment of the present disclosure.

FIG. 7A is a schematic plan view of a first substrate of another tunable phase shifter provided by an embodiment of the present disclosure; FIG. 7B is a schematic plan view of a second substrate of another tunable phase shifter provided by an embodiment of the present disclosure.

As shown in FIG. 7A, the first substrate 110 includes one first connection electrode 114 and a plurality of first signal lines 113; the first connection electrode 114 is located on a side of the plurality of first electrodes 115, and is connected to the plurality of first electrodes 115; the plurality of first signal lines 113 are respectively connected to the first connection electrode 114, so as to provide a driving voltage to the one first connection electrode 114.

As shown in FIG. 7A, the first substrate 110 further includes a bus electrode 210, and the bus electrode 210 is connected to the plurality of first signal lines 113.

As shown in FIG. 7B, the second substrate 120 includes one second connection electrode 124 and a plurality of second signal lines 123; the second connection electrode 124 is located on a side of and connected to the plurality of second electrodes 125; the plurality of second signal lines 123 are respectively connected to the second connection electrode 124, so as to provide a driving voltage to the one second connection electrode 124.

Figure 8:
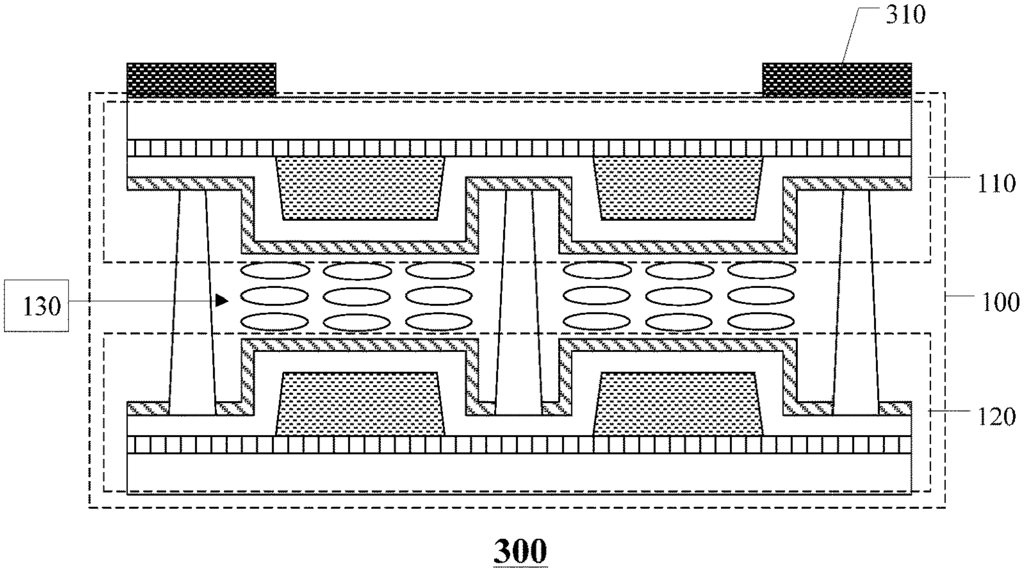
FIG. 8 is a schematic view of a tunable phase shifting device provided by an embodiment of the present disclosure.

At least one embodiment of the present disclosure further provides a tunable phase shifting device. FIG. 8 is a schematic view of a tunable phase shifting device provided by an embodiment of the present disclosure. As shown in FIG. 8, the tunable phase shifting device 300 includes the tunable phase shifter 100 provided by any one of the above examples. Because the tunable phase shifter has low transmission loss while changing the phases of the electromagnetic wave signals, the tunable phase shifting device also has better signal transmission performance.

In some examples, as shown in FIG. 8, the tunable phase shifting device 300 further includes a plurality of radiating elements 310 disposed on a side of the first substrate 110 away from the second substrate 120, or on a side of the second substrate 120 away from the first substrate 110; each radiating element 310 is used to radiate the signals tuned by the phase shifter into space, and receive electromagnetic waves from space and then send the electromagnetic waves to the phase shifter for tuning.

For example, an orthographic projection of each radiating element 310 on the first base substrate 112 is overlapped with an orthographic projection of an interval between two adjacent ones of the plurality of first electrodes 115 on the first base substrate 112. As such, electromagnetic waves can pass through the interval between the two first electrodes and radiate into the space through the radiating element.

For example, the aforementioned radiating element may be an antenna patch. Of course, the embodiments of the present disclosure include this but are not limited thereto.

Figure 9:
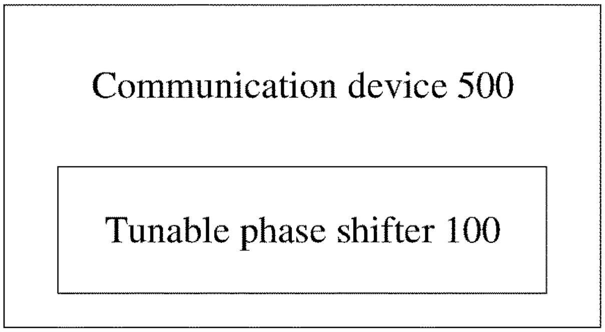
FIG. 9 is a schematic view of a communication device provided by an embodiment of the present disclosure.

At least one embodiment of the present disclosure further provides a communication device. FIG. 9 is a schematic view of a communication device provided by an embodiment of the present disclosure. As shown in FIG. 9, the communication device 500 includes the tunable phase shifter 100 provided any of the above examples. Because the tunable phase shifter has low transmission loss while changing the phases of electromagnetic wave signals, the communication device also has good signal transmission performance.

In some examples, the communication device may be an electronic product with a communication function, such as a smart phone, a tablet computer, a smart wearable device, a notebook computer, or the like.

At least one embodiment of the present disclosure further provides a method for manufacturing a tunable phase shifter.

Figure 10:
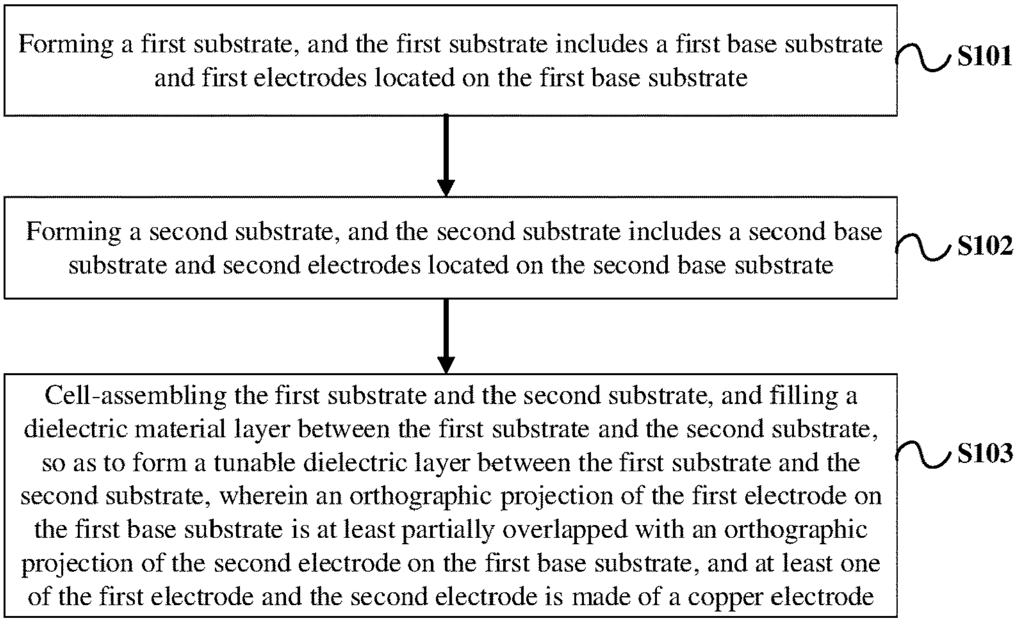
FIG. 10 is a flow chart illustrating a method for manufacturing a tunable phase shifter provided by an embodiment of the present disclosure.

FIG. 10 is a flow chart illustrating a method for manufacturing a tunable phase shifter provided by an embodiment of the present disclosure. As shown in FIG. 10, the manufacturing method includes the following steps:

Step S101: forming a first substrate, and the first substrate includes a first base substrate and first electrodes located on the first base substrate;

Step S102: forming a second substrate, and the second substrate includes a second base substrate and second electrodes located on the second base substrate;

Step S103: cell-assembling the first substrate and the second substrate, and filling a dielectric material layer between the first substrate and the second substrate, so as to form a tunable dielectric layer between the first substrate and the second substrate, an orthographic projection of the first electrode on the first base substrate is at least partially overlapped with an orthographic projection of the second electrode on the first base substrate, and at least one of the first electrode and the second electrode is made of a copper electrode.

In the manufacturing method of the tunable phase shifter provided by the embodiments of the present disclosure, because orthographic projections of the first electrodes on the first base substrate are at least partially overlapped with orthographic projections of the second electrodes on the first base substrate, the first electrodes and the second electrodes can form overlapping capacitors, and in the case that voltages are applied to the first electrodes and the second electrodes, the dielectric constant of the tunable dielectric layer between the first electrodes and the second electrodes would change, such that the phases of the electromagnetic waves on the tunable phase shifter change. Moreover, because the material of at least one of the first electrode and the second electrode includes a copper electrode, the copper electrode has high electrical conductivity, thereby reducing the transmission loss of microwave electromagnetic signals. As such, the manufacturing method of the tunable phase shifter has lower transmission loss while changing the phases of the electromagnetic wave signals.

In some examples, the above-mentioned tunable dielectric layer may be a liquid crystal layer, and the above-mentioned dielectric material layer may be a liquid crystal material. The manufacturing method of the tunable phase shifter will be described in detail below by taking the tunable dielectric layer being a liquid crystal layer as an example.

In some examples, forming the first substrate includes: forming a plurality of first electrodes on the first base substrate; using a plasma process to treat the surfaces of the plurality of first electrodes away from the first base substrate, so as to remove oxide layers on the surfaces of the first electrodes; and forming a first protection layer on a side of the plurality of first electrodes away from the first base substrate. On the one hand, the manufacturing method can prevent the plurality of first electrodes from being oxidized, and improve the stability and durability of the tunable phase shifter through removing oxide layers on the surfaces of the plurality of first electrodes by using a plasma process to treat the surfaces of the plurality of first electrodes away from the first base substrate, and forming a first protection layer on a side of the plurality of first electrodes away from the first base substrate; on the other hand, the manufacturing method can improve the flatness of the first substrate through forming the first protection layer on the side of the plurality of first electrodes away from the first base substrate, thereby improving the uniformity of the phase shift amounts of the tunable phase shifter.

In some examples, forming the first substrate further includes: coating a low-temperature optical adhesive layer on a side of the first protection layer away from the first base substrate, so as to form a first planarization filling structure between adjacent ones of the plurality of first electrodes, the thickness of the first planarization filling structure in the direction perpendicular to the first base substrate is approximately equal to the thickness of the first electrode in the direction perpendicular to the first base substrate. As such, the first planarization filling structure can greatly improve the flatness of the entire first substrate, thereby further improving the uniformity of the phase shift amounts of the tunable phase shifter. In addition, because the low-temperature optical adhesive is easy to coat, and the first planarization filling structure may be directly formed by blade coating or spin coating, without additional patterning process, which can greatly reduce the cost. In addition, the low-temperature optical adhesive is also advantaged for the transmission of electromagnetic waves.

In some examples, in the case that the thickness of the first electrode is relatively large, it is difficult to directly form a copper electrode with a relatively large thickness (e.g., a copper electrode with a thickness greater than 2 microns), therefor, forming the plurality of first electrodes on the first base substrate includes: forming a copper seed layer on the first base substrate; forming a photoresist block wall on the copper seed layer through a photolithography process; and depositing a copper metal layer on a side of copper seed layer that is not covered by the photoresist away from the first base substrate through an electroplating process, so as to form the plurality of first electrodes. Of course, the embodiments of the present disclosure include this but are not limited thereto, and other methods may also be used to form a thicker copper electrode.

For example, forming a plurality of first electrodes on the first base substrate includes: forming a copper seed layer on the first base substrate; depositing a copper metal layer on a side of the copper seed layer away from the first base substrate directly using an electroplating process; patterning the copper metal layer by using photolithography and etching processes, so as to form the plurality of first electrodes.

In some examples, forming the second substrate includes: forming a plurality of the second electrodes on the second base substrate; treating surfaces of the plurality of second electrodes away from the second base substrate by a plasma process, so as to remove oxide layers on the surfaces of the second electrodes; and forming a second protection layer on a side of the plurality of second electrodes away from the second base substrate. On the one hand, the manufacturing method can prevent the plurality of second electrodes from being oxidized, and improve the stability and durability of the tunable phase shifter through removing the oxide layers on the surfaces of the second electrodes by using a plasma process to treat the surfaces of the plurality of second electrodes away from the second base substrate, and forming a second protection layer on a side of the plurality of second electrodes away from the second base substrate; on the other hand, the manufacturing method can improve the flatness of the second substrate through forming the second protection layer on the side of the plurality of second electrodes away from the second base substrate, thereby improving the uniformity of the phase shift amounts for the tunable phase shifter.

In some examples, forming the second substrate further includes: coating a low-temperature optical adhesive layer on a side of the second protection layer away from the second base substrate, so as to form a second planarization filling structure between adjacent ones of the second electrodes, wherein the thickness of the second planarization filling structure in the direction perpendicular to the second base substrate is approximately equal to the thickness of the second electrode in the direction perpendicular to the second base substrate. As such, the second planarization filling structure can greatly improve the flatness of the entire second substrate, thereby further improving the uniformity of the phase shift amounts of the tunable phase shifter. In addition, because the low-temperature optical adhesive is easy to coat, and the second planarization filling structure may be directly formed by blade coating or spin coating, without additional patterning process, which can greatly reduce the cost. In addition, the low-temperature optical adhesive is also advantaged for the transmission of electromagnetic waves.

In some examples, the manufacturing method of the tunable phase shifter further includes: coating a photoresist material layer on a side of the first substrate close to the second substrate; and exposing the photoresist material layer by a photolithography process to form a plurality of spacers, the maximum dimension in the direction parallel to the first base substrate of the orthographic projection of the spacer on the first base substrate is D1, and the distance between two adjacent ones of the spacers is D2, the ratio of D2 to D1 ranges from 6 to 12. As such, through setting the above-mentioned distance between two adjacent spacers PS, the manufacturing method can improve the thickness uniformity of the tunable dielectric layer between the first substrate and the second substrate, thereby further improving the uniformity of phase shift amounts. In addition, because the spacers are formed of photoresist material, which can be patterned directly through an exposure process without an etching process, the cost can be reduced.

For example, the maximum dimension D1 of the orthographic projection of the spacer on the first base substrate in a direction parallel to the first base substrate ranges from 40 microns to 60 microns, such as 50 microns. It should be noted that, in the case that the shape of the orthographic projection of the spacer on the first base substrate is a circle, the above-mentioned maximum dimension D1 may be the diameter of the circle; in the case that the shape of the orthographic projection of the spacer on the first base substrate is an ellipse, the above-mentioned maximum dimension D1 may be the major axis dimension of the ellipse; in the case that the shape of the orthographic projection of the spacer on the first base substrate is a polygon, the above-mentioned maximum dimension D1 may be a length of the largest diagonal of the polygon.

In some examples, the distance D2 between two adjacent ones of the spacers ranges from 360 microns to 480 microns, such as 400 microns.

In some examples, in the process of exposing the photoresist material layer by a photolithography process to form the plurality of spacers, at least one spacer may be formed between two adjacent ones of the second electrodes, such that the uniformity of the thickness between the first substrate and the second substrate can be better maintained, thereby ensuring the uniformity of the phase shift amounts of the tunable phase shifter.

In some examples, in the process of exposing the photoresist material layer by a photolithography process to form the plurality of spacers, multiple spacers arranged in an array may be disposed on the peripheral region of the second substrate, which may avoid the deformation of the first substrate and the second substrate at the edge of the electrode region, thereby better maintaining the uniformity of the thickness between the first substrate and the second substrate, and further ensuring the uniformity of the phase shift amounts of the tunable phase shifter. It should be noted that, a region of the second substrate provided with the second electrodes is an electrode region, while a region of the second substrate on the periphery of the electrode region is the peripheral region.

An embodiment of the present disclosure further provides another method for manufacturing a tunable phase shifter, which includes the following steps:

depositing a layer of indium tin oxide (ITO) on a first glass substrate, the thickness of ITO is preferably 400 angstroms to 700 angstroms; and then patterning the ITO by photolithography and etching processes to form a first signal line, the line width of the first signal line may be 20.9 microns.

depositing a copper metal with a certain thickness (e.g., 1.5 microns to 2 microns) on the first glass substrate and the first signal line by a sputtering equipment, and then patterning the copper metal by photolithography and etching processes, thereby forming a plurality of first electrodes.

treating the surfaces of the plurality of first electrodes through a plasma process (e.g., using $NH_3$ plasma) to remove oxide layers on the surfaces of the plurality of first electrodes.

depositing an inorganic film layer (e.g., a first protection layer) on a side of the plurality of first electrodes away from the first glass substrate to serve as a wrapping layer and covering layer for the first electrodes, the material of the inorganic film layer is preferably one or more selected from a group consisting of silicon nitride, silicon oxide, silicon oxynitride, titanium oxide and aluminum oxide.

depositing a layer of indium tin oxide (ITO) on a second glass substrate, the thickness of ITO is preferably 400 angstroms to 700 angstroms; then patterning the ITO by photolithography and etching processes to form a second signal line, the line width of the second signal line may be 20.9 microns.

depositing a copper metal with a certain thickness (e.g., 1.5 microns to 2 microns) on the second glass substrate and the second signal line by a sputtering equipment, and then patterning the copper metal by photolithography and etching processes, thereby forming a plurality of second electrodes.

treating surfaces of the plurality of second electrodes through a plasma process (e.g., using $NH_3$ plasma) to remove oxide layers on the surfaces of the plurality of second electrodes.

depositing an inorganic film layer (e.g., a second protection layer) on a side of the plurality of second electrodes away from the second glass substrate to serve as a wrapping layer and covering layer for the second electrodes, wherein the material of the inorganic film layer is preferably one or more selected from a group consisting of silicon nitride, silicon oxide, silicon oxynitride, titanium oxide and aluminum oxide.

coating a photoresist material with a certain thickness through a spin coating process or a slit coating process, and then patterning the photoresist material through an exposure process to form a plurality of spacers.

respectively forming polyimide (PI) layers on a side of the first protection layer away from the first glass substrate and a side of the second protection layer away from the second glass substrate, and then performing an alignment process, so as to form a first substrate including a first alignment layer and a second substrate including a second alignment layer.

cell-assembling the first substrate and the second substrate to form a liquid crystal cell, and injecting a liquid crystal material into the liquid crystal cell to form a phase shifter.

An embodiment of the present disclosure further provides another method for manufacturing a tunable phase shifter, which includes the following steps:

depositing a layer of indium tin oxide (ITO) on the first glass substrate, the thickness of ITO is preferably 400 angstroms to 700 angstroms; then patterning the ITO by photolithography and etching processes to form a first signal line, the line width of the first signal line may be 20.9 microns.

respectively depositing 300 angstrom of molybdenum metal and 3000 angstroms of copper metal on the first glass substrate and the first signal line to serve as seed layers, and then using an electroplating process to deposit a thick copper metal layer with a thickness of 2 microns to 5 microns to serve as a plurality of first electrodes.

It should be noted that, there are two ways to deposit the thick copper metal layer with the thickness of 2 microns to 5 micron as the plurality of first electrodes by electroplating process; a first way is an additive method which includes the following steps, after the seed layer is deposited, a photoresist block wall is firstly formed through a photolithography process, and then an electroplating is performed, and after the electroplating process is completed, a stripping process and an etching process are performed, so as to form the plurality of first electrodes; a second way is a subtractive method which includes the following steps: after the seed layer is deposited, an electroplating process is directly performed to form the thick copper layer, and a photolithography process and an etching process are then performed to form the plurality of first electrodes.

treating the surfaces of the plurality of first electrodes by a plasma process (e.g., using $NH_3$ plasma), so as to remove oxide layers on the surfaces of the plurality of first electrodes.

depositing an inorganic film layer (e.g., a first protection layer) on a side of the plurality of first electrodes away from the first glass substrate to serve as a wrapping layer and covering layer for the first electrodes, wherein the material of the inorganic film layer is preferably one or more selected from a group consisting of silicon nitride, silicon oxide, silicon oxynitride, titanium oxide and aluminum oxide.

coating a low-temperature optical adhesive layer with a thickness of 3-5 microns on the first protection layer by a spin coating process or a slit coating process to reduce a level height difference between the region with the first electrodes and the region without the first electrodes. As such, on the one hand, the height of the spacers needs to be formed subsequently can be reduced, and on the other hand, the uniformity of the cell thickness of the subsequently formed liquid crystal cell can be improved, thereby improving the performance of the tunable phase shifting device.

depositing a layer of indium tin oxide (ITO) on a second glass substrate, the thickness of ITO is preferably 400 angstroms to 700 angstroms; then patterning the ITO by photolithography and etching processes to form a second signal line, wherein the line width of the second signal line may be 20.9 microns.

respectively depositing 300 angstroms of molybdenum metal and 3000 angstroms of copper metal on the second glass substrate and the second signal line to serve as seed layers, and then using an electroplating process to deposit a thick copper metal layer with a thickness of 2 microns to 5 microns to serve as a plurality of second electrodes.

It should be noted that, there are two ways to deposit the thick copper metal layer with the thickness of 2 microns to 5 micron as the plurality of second electrodes by electroplating process; a first way is an additive method which includes the following steps, after the seed layer is deposited, a photoresist block wall is firstly formed through a photolithography process, and then an electroplating is performed, and after the electroplating process is completed, a stripping process and an etching process are performed, so as to form the plurality of second electrodes; a second way is a subtractive method which includes the following steps: after the seed layer is deposited, an electroplating process is directly performed to form the thick copper layer, and a photolithography process and an etching process are then performed to form the plurality of second electrodes.

treating the surfaces of the plurality of second electrodes by a plasma process (e.g., using $NH_3$ plasma), so as to remove oxide layers on the surfaces of the plurality of second electrodes.

depositing an inorganic film layer (i.e., a second protection layer) on a side of the plurality of second electrodes away from the second glass substrate to serve as a wrapping layer and covering layer for the second electrodes, wherein the material of the inorganic film layer is preferably one or more selected from a group consisting of silicon nitride, silicon oxide, silicon oxynitride, titanium oxide and aluminum oxide.

coating a photoresist material with a certain thickness through a spin coating process or a slit coating process, and then patterning the photoresist material through an exposure process to form a plurality of spacers.

respectively forming polyimide (PI) layers on a side of the first protection layer away from the first glass substrate and a side of the second protection layer away from the second glass substrate, and then performing an alignment process, so as to form a first substrate including a first alignment layer and a second substrate including a second alignment layer.

cell-assembling the first substrate and the second substrate to form a liquid crystal cell, and injecting a liquid crystal material into the liquid crystal cell to form a tunable phase shifter.

The following statements should be noted:

(1) In the accompanying drawings of the embodiments of the present disclosure, the drawings involve only the structure(s) in connection with the embodiment(s) of the present disclosure, and other structure(s) can be referred to common design(s).

(2) In the case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

The invention claimed is:

1. A tunable phase shifter, comprising:

a first substrate, comprising a first base substrate and at least one first electrode on the first base substrate;

a second substrate, comprising a second base substrate and at least one second electrode on the second base substrate; and a tunable dielectric layer, between the first substrate and the second substrate, wherein an orthographic projection of the at least one first electrode on the first base substrate is at least partially overlapped with an orthographic projection of the at least one second electrode on the first base substrate, and sheet resistances of materials of the at least one first electrode and the at least one second electrode are both less than or equal to 0.024Ω/□.

2. The tunable phase shifter according to claim 1, further comprising:

a plurality of spacers, located between the first substrate and the second substrate to maintain an interval between the first substrate and the second substrate, wherein the at least one second electrode comprises a plurality of second electrodes, two adjacent second electrodes of the plurality of second electrodes are provided with at least one of the plurality of spacers.

3. The tunable phase shifter according to claim 2, wherein the second substrate comprises an electrode region and a peripheral region on a periphery of the electrode region, the at least one second electrode is located in the electrode region, and the peripheral region is provided with multiple spacers of the plurality of spacers arranged in an array.

4. The tunable phase shifter according to claim 3, wherein, in the electrode region, an orthographic projection of a spacer of the plurality of spacers on a reference line perpendicular to the second base substrate is overlapped with an orthographic projection of the at least one second electrode on the reference line.

5. The tunable phase shifter according to claim 2, wherein a maximum dimension in a direction parallel to the first base substrate of an orthographic projection of a spacer of the plurality of spacers on the first base substrate is D1, a distance between two adjacent ones of the plurality of spacers is D2, and a ratio of D2 to D1 ranges from 6 to 12.

6. The tunable phase shifter according to claim 2, wherein a ratio of a height of a spacer of the plurality of spacers in a direction perpendicular to the second base substrate to a distance between the first substrate and the second substrate ranges from 1 to 2.30.

7. The tunable phase shifter according to claim 2, wherein a ratio of a thickness of the at least one second electrode in a direction perpendicular to the second base substrate to a height of a spacer of the plurality of spacers in a direction perpendicular to the second base substrate ranges from 0.125 to 0.28.

8. A tunable phase shifting device, comprising:

the tunable phase shifter according to claim 1; and a plurality of radiating elements, disposed on a side of the first substrate away from the second substrate, or on a side of the second substrate away from the first substrate.

9. The tunable phase shifter according to claim 1, wherein a thickness of the at least one first electrode in a direction perpendicular to the first base substrate ranges from 1.5 microns to 5 microns, and a thickness of the at least one second electrode in a direction perpendicular to the second base substrate ranges from 1.5 microns to 5 microns.

10. The tunable phase shifter according to claim 1, wherein a shape of a first cross section, cut by a plane perpendicular to the first base substrate, of the at least one first electrode comprises a trapezoid or a rectangle, and an angle range of a bottom angle of the first cross section away from the tunable dielectric layer is 70 degrees to 90 degrees; and/or a shape of a second cross section, cut by a plane perpendicular to the second base substrate, of the at least one second electrode comprises a trapezoid or a rectangle, and an angle range of a bottom angle of the second cross section away from the tunable dielectric layer is 70 degrees to 90 degrees.

11. The tunable phase shifter according to claim 1, wherein the at least one first electrode comprises a plurality of first electrodes spaced apart from each other and a first connection electrode connected to the plurality of first electrodes, the at least one second electrode comprises a plurality of second electrodes spaced apart from each other and a second connection electrode connected to the plurality of second electrodes, the plurality of the first electrodes and the plurality of the second electrodes are disposed in one-to-one correspondence, and an orthographic projection of the respective first electrode on the first base substrate is at least partially overlapped with an orthographic projection of a corresponding second electrode on the first base substrate.

12. The tunable phase shifter according to claim 11, wherein the first substrate further comprises a first planarization filling structure located between adjacent ones of the plurality of first electrodes, and a thickness of the first planarization filling structure in a direction perpendicular to the first base substrate is approximately equal to a thickness of the respective first electrode in a direction perpendicular to the first base substrate; and/or the second substrate further comprises a second planarization filling structure located between adjacent ones of the plurality of second electrodes, and a thickness of the second planarization filling structure in a direction perpendicular to the second base substrate is approximately equal to a thickness of the corresponding second electrode in a direction perpendicular to the second base substrate.

13. The tunable phase shifter according to claim 12, wherein materials of the first planarization filling structure and the second planarization filling structure comprise one or more selected from a group consisting of an optical adhesive, a photoresist and a photocurable adhesive.

14. The tunable phase shifter according to claim 11, wherein an overlapping distance in an arrangement direction of the plurality of first electrodes of an orthographic projection of the respective first electrode on the first base substrate and an orthographic projection of the corresponding second electrode on the first base substrate is greater than 90% of a dimension of the respective first electrode or the second electrode in the arrangement direction of the plurality of first electrodes.

15. A method for manufacturing a tunable phase shifter, comprising:

forming a first substrate, wherein the first substrate comprises a first base substrate and a first electrode on the first base substrate;

forming a second substrate, wherein the second substrate comprises a second base substrate and a second electrode on the second base substrate; and cell-assembling the first substrate and the second substrate, and filling a liquid crystal between the first substrate and the second substrate, so as to form a tunable dielectric layer between the first substrate and the second substrate, wherein an orthographic projection of the first electrode on the first base substrate is at least partially overlapped with an orthographic projection of the second electrode on the first base substrate, and sheet resistances of materials of the first electrode and the second electrode are both less than or equal to 0.024Ω/□.

16. The method for manufacturing the tunable phase shifter according to claim 15, wherein the forming the second substrate comprises:

forming a plurality of second electrodes on the second base substrate;

using a plasma process to treat surfaces of the plurality of the second electrodes away from the second base substrate to remove oxide layers on the surfaces of the second electrodes; and forming a second protection layer on a side of the plurality of second electrodes away from the second base substrate.

17. The method for manufacturing the tunable phase shifter according to claim 16, wherein the forming the second substrate further comprises:

coating a low-temperature optical adhesive layer on a side of the second protection layer away from the second base substrate to form a second planarization filling structure between adjacent ones of the plurality of second electrodes, wherein a thickness of the second planarization filling structure in a direction perpendicular to the second base substrate is approximately equal to a thickness of the second electrode in a direction perpendicular to the second base substrate.

18. The method for manufacturing the tunable phase shifter according to claim 15, further comprising:

coating a photoresist material layer on a side of the first substrate close to the second substrate; and exposing the photoresist material layer by a photolithography process to form a plurality of spacers, wherein a maximum dimension of an orthographic projection of a spacer of the plurality of the spacers on the first base substrate in a direction parallel to the first base substrate is D1, and a distance between two adjacent ones of the plurality of spacers is D2, and a ratio of D2 to D1 ranges from 6 to 12.

19. The method for manufacturing the tunable phase shifter according to claim 15, wherein the forming the first substrate comprises:

forming a plurality of first electrodes on the first base substrate;

using a plasma process to treat surfaces of the plurality of first electrodes away from the first base substrate to remove oxide layers on the surfaces of the plurality of first electrodes; and forming a first protection layer on a side of the plurality of first electrodes away from the first base substrate.

20. The method for manufacturing the tunable phase shifter according to claim 19, wherein the forming the first substrate further comprises:

coating a low-temperature optical adhesive layer on a side of the first protection layer away from the first base substrate to form a first planarization filling structure between adjacent ones of the plurality of first electrodes, wherein a thickness of the first planarization filling structure in a direction perpendicular to the first base substrate is approximately equal to a thickness of the first electrode in a direction perpendicular to the first base substrate.

* * * * *